(12) United States Patent
Lindner et al.

(10) Patent No.: US 9,131,508 B2
(45) Date of Patent: Sep. 8, 2015

(54) DYNAMIC RESOURCE ADJUSTMENT FOR ESTABLISHING AND MAINTAINING A CALL OF INTEREST

(71) Applicant: QUALCOMM Incorporated, San Diego, CA (US)

(72) Inventors: Mark Aaron Lindner, Verona, WI (US); Rahul Sachdev, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 18 days.

(21) Appl. No.: 14/146,186

(22) Filed: Jan. 2, 2014

(65) Prior Publication Data
US 2015/0189661 A1    Jul. 2, 2015

(51) Int. Cl.
H04W 72/04 (2009.01)
H04W 24/08 (2009.01)
H04M 3/22 (2006.01)
H04M 3/42 (2006.01)
H04W 52/02 (2009.01)
H04L 29/08 (2006.01)
H04W 8/24 (2009.01)

(52) U.S. Cl.
CPC ........ H04W 72/0493 (2013.01); H04M 3/2281 (2013.01); H04M 3/42144 (2013.01); H04W 24/08 (2013.01); H04W 52/0261 (2013.01); H04L 67/025 (2013.01); H04M 2203/1016 (2013.01); H04W 8/245 (2013.01)

(58) Field of Classification Search
CPC . H04M 2215/32; H04W 36/14; H04W 24/08; H04W 72/0493; H04L 5/0073
USPC .............. 455/405, 522, 436; 370/344, 433
See application file for complete search history.

(56) References Cited

U.S. PATENT DOCUMENTS

| 5,570,411 | A | 10/1996 | Sicher |
| 6,282,430 | B1 * | 8/2001 | Young ............................ 455/522 |
| 6,760,594 | B1 | 7/2004 | Murasawa et al. |
| 8,300,792 | B2 | 10/2012 | Sennett et al. |
| 2007/0149166 | A1 | 6/2007 | Turcotte et al. |
| 2007/0190995 | A1 | 8/2007 | Wang et al. |
| 2009/0232130 | A1 | 9/2009 | Philavong |
| 2013/0090110 | A1 | 4/2013 | Cloonan et al. |
| 2013/0260758 | A1 * | 10/2013 | Zhao et al. .................... 455/436 |

FOREIGN PATENT DOCUMENTS

GB    2461401 A    1/2010

OTHER PUBLICATIONS

International Search Report and Written Opinion—PCT/US2014/071702—ISA/EPO—Mar. 25, 2015.

* cited by examiner

*Primary Examiner* — Phuoc H Doan
(74) *Attorney, Agent, or Firm* — The Marbury Law Group, PLLC

(57) ABSTRACT

Methods, systems and devices are provided for dynamically adjusting mobile communication device resources for maintaining calls on a mobile communication device subject to a lawful intercept. Embodiment methods may include receiving at the mobile communication device an activation input from a remote server for activating a call extender daemon on the mobile communication device. An operating state of an onboard resource of the mobile communication device may be adjusted in response to receiving the activation input. The adjustment of the operating state of the onboard resource increases the likelihood of maintaining an active call on the mobile communication device.

18 Claims, 14 Drawing Sheets

DYNAMIC RESOURCE ADJUSTMENT FOR ESTABLISHING AND MAINTAINING A CALL OF INTEREST

BACKGROUND

Most communication networks include a capability for lawful interception of communication network data for the purpose of analysis and/or evidence by a lawful authority. Such communication network data may include signaling or network management information, as well as the actual communications themselves, such as through wiretapping of active calls. Many nations even enact laws to enhance the ability of law enforcement and intelligence agencies to conduct surveillance of telecommunications. Such nations generally require that telecommunication carriers, networks and equipment manufacturers modify and design their equipment to facilitate lawful interception. For example, with the proper authorization law enforcement personnel may lawfully listen-in on mobile communications using location information the mobile communication devices are required to make available when establishing and maintaining connections for a call.

Thus, lawful intercept allows an individual telephone call to be identified and tap into. On occasion tapped calls are prematurely terminated due to signaling problems or insufficient battery when a mobile communication device is involved on one end of the call.

SUMMARY

The various embodiments include methods, systems and devices for dynamically adjusting mobile communication device resources for the purpose of maintaining a call that is subject to a lawful interception. In an embodiment, a call extender daemon for maintaining calls may be operated as a daemon running on an application layer or modem layer of a mobile communication device. The daemon may receive input and implement protocols of the call extender daemon designed to maintain a call of interest. In this way, a call extender input may be received at the mobile communication device from a remote source, such as a remote server of an eavesdropping lawful interception authority. The call extender input may activate the call extender daemon on the mobile communication device, which then may be responsive to additional call extender inputs. The call extender daemon may adjust, activate or deactivate one or more onboard resources of the mobile communication device in order to increase the likelihood that the active call will be maintained on that mobile communication device. The embodiments enable a law enforcement authority to take an action to maintain or extend a call involved in a lawful interception by increasing that likelihood that the call will be maintained and/or that the mobile device will not drain its battery before the call would otherwise be ended by a target of the lawful intercept.

In an embodiment, a method of dynamically adjusting mobile communication device resources for maintaining calls may include receiving at the mobile communication device an activation input from a remote server associated with a lawful interception. A call extender daemon on the mobile communication device may be activated by the activation input. The activation input may be received via an Internet protocol channel, a unicast message and an overhead power control channel. In response to the activation signal the call extender daemon may adjust an operating state of one or more onboard resources of the mobile communication device without notifying the user. The adjustment of the operating state of the one or more onboard resources may increase a likelihood of maintaining an active call on the mobile communication device, such as by reducing battery drain (and thus potentially extending the time that the call can be sustained by the device) or increasing power to the components supporting the call.

Additionally, a resource status indication may be transmitted from the mobile communication device for analysis at a remote server associated with the lawful intercept. The resource status indication may reflect a state of one or more onboard resources of the mobile communication device, including the battery charge state and one or more resources adjusted by the call extender input. A state of onboard resources of the mobile communication device may be determined by the remote, such as whether the one or more onboard resources are in a state that could lead to premature termination of the on-going call or whether adjusting one of the resources could increase the likelihood of maintaining the active call. Based on this determination, another signal may be sent to the mobile communication device from the remote server associated with a lawful interception in order to further adjust a device resource to increase the likelihood of maintaining the active call. In an embodiment, the second signal adjusting the operating state of the first onboard resource may cause the call extender daemon to activate the idle onboard resource.

In a further embodiment, the method may include determining a historical usage pattern of the onboard resources, and determining the first resource adjustment may be based on the historical usage pattern.

The call extender daemon need not be subject to being deactivated by a user of the mobile communication device. Also, the call extender daemon may actively conceal itself from the user, particularly when an operating state of an onboard resource is adjusted.

In a further embodiment, a registration initiator may be received from the remote server at the mobile communication device, and a register request may be transmitted from the mobile communication device in response to receiving the registration initiator. The register request may be adapted to provide a remote resource with an end point address for delivery of commands to the call extender daemon on the mobile communication device.

Further embodiments may include receiving a resource status indication from a mobile communication device at a remote server. The resource status indication may reflect a state of onboard resources of the mobile communication device, wherein an operating state of one or more of the onboard resources may decrease a likelihood of maintaining a call active on the mobile communication device. Also, an activation input may be transmitted to a call extender daemon on the mobile communication device. The activation input may be configured to cause the call extender daemon to adjust the operating state of a first onboard resource for increasing the likelihood of maintaining the active call on the mobile communication device. A first resource adjustment may be determined based on the state of onboard resources identified in the received resource status indication and included in an adjustment signal sent to the mobile communication device. The adjustment of the operating state of the first onboard resource of the mobile communication device may be based on the first resource adjustment. For example, if the state of the onboard resources reveals that the first onboard resource is inactive, the adjustment signal sent to the mobile communication device may be configured to cause the call extender daemon to activate the first onboard resource. Further, a historical usage pattern of the onboard resources may be determined, and the first resource adjustment may be based on the historical usage pattern.

Further embodiments may include a computing device having a processor configured with processor-executable instructions to perform various operations corresponding to the methods discussed above.

Further embodiments may include a computing device having various means for performing functions corresponding to the method operations discussed above.

Further embodiments may include a non-transitory processor-readable storage medium having stored thereon processor-executable instructions configured to cause a processor to perform various operations corresponding to the method operations discussed above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
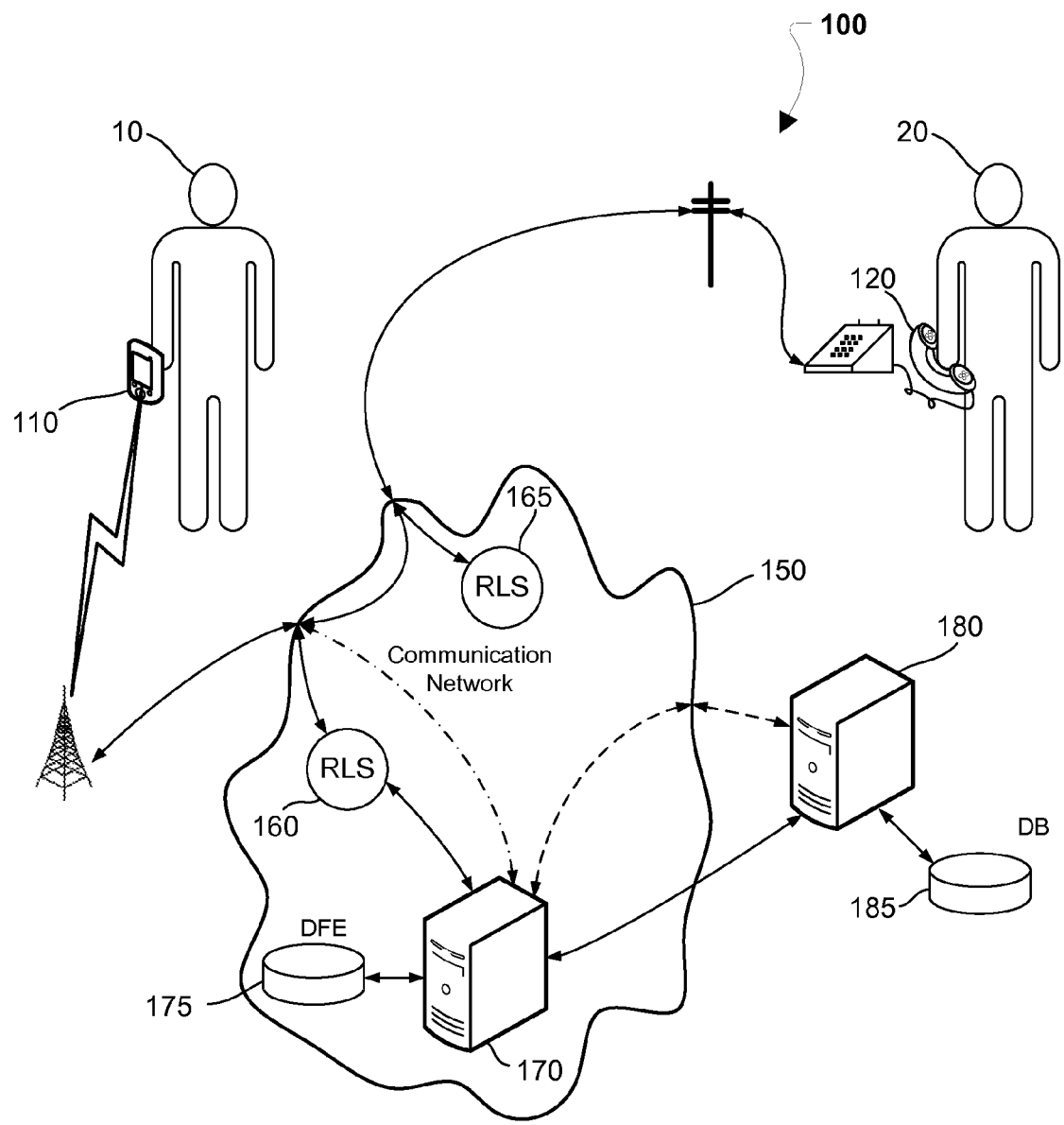
FIG. 1 is a communication system schematic diagram illustrating functionality of various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The term "mobile communication device" refers to any one or all of cellular telephones, smartphones, personal or mobile multi-media players, personal data assistants (PDA's), laptop computers, tablet computers, smartbooks, palm-top computers, wireless electronic mail receivers, multimedia Internet enabled cellular telephones, wireless gaming controllers, and similar personal electronic devices which include a programmable processor, memory and cellular telephone circuitry configured to conduct cellular telephone calls.

As used herein, in connection with a mobile communication device the terms "resource" or "onboard resource" are used interchangeably to refer to hardware, software and/or any other asset that may be used by the mobile communication device and are apart of the mobile communication device. Onboard resources refer to hardware physically joined with the mobile communication device or software executed or partially executed on an onboard processor or component of the mobile communication device. An onboard resource may include at least one of a power source, a processor, a function (e.g., a software process), memory, a radio, communication ports, an input device (e.g., a sensor, keyboard, buttons or touchscreen) or an output device (e.g., a display or speakers) available to the mobile communication device. Processor and memory resources may include computational hardware and software. Onboard resources are distinguished from remote resources that are physically separate from the mobile communication device or software executed or partially executed by a processor physically separate from the mobile communication device. However, local peripheral devices are physically located in close proximity to the mobile communication device and are directly connected by wired or short-range wireless connections (e.g., via USB, FireWire, Bluetooth®, ANT+®, Zigbee®, etc.) may be treated like an onboard resource, and thus considered a mobile communication device resource as referred to herein.

Law enforcement may use lawful intercept to secretly monitor a telephone call identified as a call of interest. There maybe circumstances in which law enforcement would like to make sure that calls via a mobile communications device that is the subject of lawful intercepts are successfully established and that such calls are not dropped so that successful or extended wiretaps can be completed. To address this need, the various embodiments enable law enforcement to signal to a targeted mobile communication device signals that cause it to take actions enable the establishment and/or maintenance of calls of interest. Those actions may include altering one or more settings on the mobile communication device involved in the call of interest in order to increase the likelihood that the call will be established, maintained and/or not dropped.

In the various embodiments, settings and resource allocations of a mobile communication device may be dynamically and remotely adjusted in order to establish/maintain a call of interest to a lawful intercept. For example, if the battery of a mobile communication device is low, a lawful intercept authority may send a signal to the mobile communication device causing it to change settings or shut down certain functions in order to conserve battery power so that the call can be maintained longer. Such measures may reduce the chance that the call under a lawful intercept is dropped by conserving the power available in the battery. Similarly, other resources may be turned off, turned on, and/or otherwise adjusted in order to increase the likelihood that the call of interest will not be dropped. In order to dynamically and remotely adjust resource allocations, the various embodiments provide a lawful intercept authority with mechanisms to remotely access the mobile communication device conducting a call of interest and activate an call extender daemon on the device that automatically takes actions to adjust the device resources as directed. In this way, one or more select onboard resources of the mobile communication device may be adjusted as part of a resource allocation designed to ensure a call of interest is established and maintained. A determination may be made regarding the resource(s) to be adjusted and/or the extent to which individual resources should be adjusted may be predetermined and/or determined dynamically in response to an analysis of the device resources.

FIG. 1 illustrates some components of a cellular telephone system 100 involved in a lawful intercept of a call of interest between two individuals 10, 20. FIG. 1 shows one individual 10 connected to the call of interest using a mobile communication device 110, while the other individual 20 is on a landline telephone 120, although both individuals 10, 20 may be on mobile communication devices. The mobile communication device 110 and the landline telephone 120 are operatively connected through a communication network 150 that includes regional location service(s) (RLS) 160, 165.

A lawful authority using a dispatcher 170 or eavesdropping server 180 may gain network access to a mobile communication device 110 involved in a call of interest using an Internet Protocol (IP) connection and the session initiation protocol (SIP) registrations digital communications use for establishing and maintaining a call. The SIP is a signaling communications protocol, widely used for controlling multimedia communication sessions such as voice and video calls over Internet Protocol (IP) networks. If a mobile communication device user wants to initiate a call with another user, the SIP must discover the current host(s) at which the destination user is reachable. This discovery process is frequently accomplished by SIP network elements, such as proxy servers and redirect servers which are responsible for receiving a request, determining where to send it based on knowledge of the location of the user, and then sending it there. To do this, the SIP network elements consult an abstract service known as a location service 160, 165, which provides address bindings for a particular domain.

Public safety and/or law enforcement agencies generally have a plurality of dispatcher facilities that interface with the cellular telephone system. FIG. 1 includes a dispatcher 170 and its associated database front end 175, as well as an eavesdropping server 180 with its own database 185. A dispatcher 170 may be a network server used to establish a call, such as a push-to-talk call host server. The dispatcher 170 may receive a request from a caller originating a call, such as mobile communication device 110. The dispatcher 170 in-turn reaches out to one or more intended receivers of the call (e.g., telephone 120) by transmitting a call announcement signal. The dispatcher 170 may connect to a regional location service 160, 165, for example, by using Internet protocol connectivity. Such a connection may be achieved through virtual private networking or through an actual private network (i.e., behind the same firewall). The eavesdropping server 180 may access this dispatcher 170 to obtain needed information about end points of the call (including IP address, ports, username, etc.). Also, the eavesdropping server 180 may monitor the streaming real-time protocol audio or video. Such an eavesdropping function may be performed by the eavesdropping server 180, a separate entity with access to the dispatcher 170, or by an added functionality of the dispatcher 170.

Figure 2:
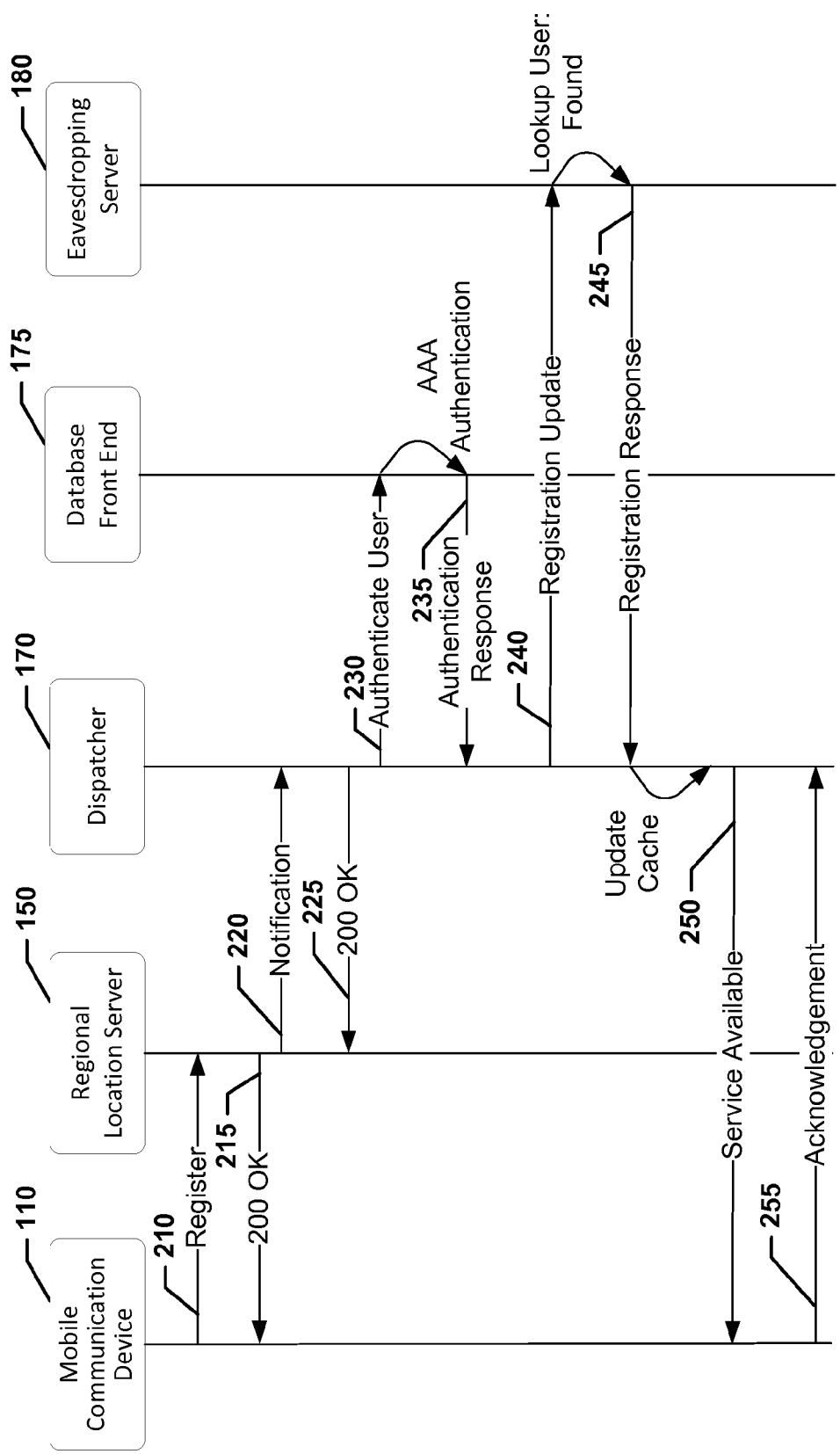
FIG. 2 is a communication flow diagram of a mobile communication device IP address registration in accordance with various embodiments.

With a data connection established, a call extender algorithm resident on the mobile communication device 110 (referred to herein as a call extender daemon or a call extender daemon) may register with a central service that handles session SIP registrations. FIG. 2 illustrates communication flows for IP address registration by the call extender daemon on the mobile communication device 110. Such IP address registration keeps the dispatcher 170 and eavesdropping server 180 updated as to the IP address assignment of a mobile communication device 110. The IP address, once assigned, will act as an endpoint for commands and communications to be sent to the mobile communication device 110, including signals from a law enforcement authority sending commands to a call extender daemon in a target mobile communication device.

Commands and communications with the mobile communication device 110 may be used to activate and control the call extender daemon built into the mobile communication device as a call extender daemon for the purpose of establishing, maintaining and/or extending calls. The call extender daemon may run on an application layer or modem layer of the mobile communication device 110. Such a call extender daemon may be a computer program that runs as a background process, rather than being under the direct control of an interactive user of the mobile communication device 110. Thus, once installed and/or activated the call extender daemon may register itself by communicating a session indication protocol (SIP) registration to network complements. This registration may keep network components, such as the regional location server (RLS) 150, dispatcher 170 and eavesdropping server 180, up to date with an IP address assignment for the mobile communication device. The call extender daemon may maintain the registration through periodic or event-based triggers. Such event-based triggers may include acquisition of a new IP address when air-interface becomes newly available and/or upon the occurrence of network events such as fades or other network system issues.

In an embodiment, the call extender daemon may be provided within a secure layer, such as with the trust zone operating software configured by the original equipment manufacturer (OEM). In another embodiment, the call extender daemon may be installed by the network service provider on the mobile communication device as a service below the OEM layer, such as at the CDMA layer.

The registration process may initially include a register request 210 transmitted from the mobile communication device 110 to a regional location server 150. If the register request 210 is properly submitted, the regional location server 150 may respond to the mobile communication device 110 with a "200 OK" signal indicating the request was properly received. Also, the regional location server 150 may transmit a notification 220 to a dispatcher 170. The dispatcher 170 may also respond with a 200 OK signal to the regional location server 150 to indicate the notification was successfully received. The dispatcher 170 may then authenticate the mobile communication device by accessing 230 a database front end 175. After implementing an authentication, authorization, accounting (AAA) routine the database front end 175 may provide an authentication response 235 to the dispatcher 170. The dispatcher 170 may transmit a registration update 240 to the eavesdropping server 180. The eavesdropping server 180 may then look up a user or mobile communication device identifier associated with the registration. The user or mobile communication device identifier may be a telephone number of the mobile communication device 110 or other identifier. This type of lookup may access a local or remote resource, such as a database. If the user's mobile communication device is found, the eavesdropping server 180 may update its own database and transmit a registration when you so you response 245 back to the dispatcher 170. The dispatcher 170 may update its cache in response to receiving the registration update response 245 and transmit a service available message 252 the mobile communication device 110. The mobile communication device 110 may transmit an acknowledgment 255 to the dispatcher 170 indicating that it is aware the SIP registration process was successful. In order to ensure users are not tipped off to lawful intercepts, the communications and operations illustrated in FIG. 2 may be accomplished without generating an observable or discoverable display, affect, or data structure on the mobile communication device.

Figure 3:
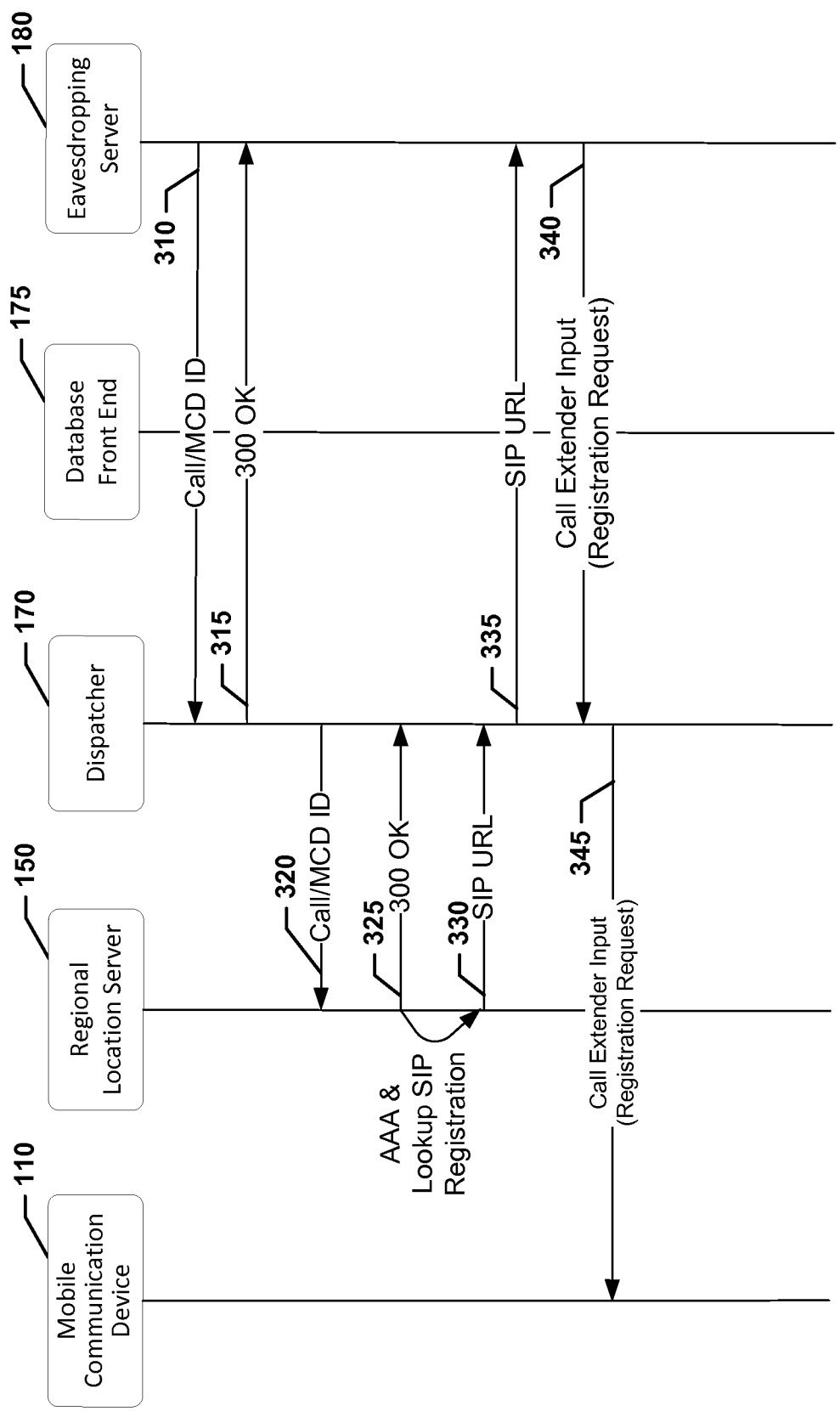
FIG. 3 is a communication flow diagram of an activation of a call extender daemon on a mobile communication device in accordance with various embodiments.

FIG. 3 illustrates communication flows for activating a call extender daemon integrated as a dormant service on the mobile communication device 110. In this way, virtually any mobile communication device may include a call extender daemon, which is only used if it receives an activation signal from a law enforcement authority. Such an activation signal may originate from an eavesdropping server 180 associated with a lawful authority. The lawful authority may have learned that the mobile communication device 110 is currently involved in or will likely be involved in a call of interest. For example, the mobile communication device or its owner may be identified in a warrant for a lawful intercept. Thus, a law enforcement authority may determine how to reach the target mobile communication device 110 and transmit an activation signal to the device in order to initiate registration by the call extender daemon deployed thereon.

To initiate or request registration, the eavesdropping server 180 may transmit a Call/MCD ID 310 to a dispatcher 170. The Call/MCD ID 310 may identify a call of interest and or a particular mobile communication device 110 using a call ID, username, mobile device telephone number, or other call identifier available and/or known to the lawful authority. If the Call/MCD ID 310 is properly received, the dispatcher 170 may respond to the eavesdropping server 180 with a "200 OK" signal indicating as much. Also, the dispatcher 170 may transmit a Call/MCD Lookup 320 to the regional location server 150. In this way, the regional location server 150 may be used to identify an associated SIP URL assigned to a particular call session by the mobile communication device 110. The regional location server 150 generally has or can gain access to databases that associate service subscription information, required for all mobile communication devices, to SIP URL's for active calls. The IP connection of the SIP URL identified by the regional location server 150 may carry only the background metadata exchanges generally used to maintain a connection, but may also host the voice data of the call of interest as well.

If the Call/MCD Lookup 320 is properly received, the regional location server 150 may respond to the dispatcher 170 with a "200 OK" signal indicating as much. Additionally, after an AAA verification, the regional location server 150 may look up the SIP registration and transmit an SIP URL 332 the dispatcher 170. The dispatcher 170 may then convey the SIP URL 335 back to the eavesdropping server 180. In this way, the eavesdropping server 180 may be provided with an endpoint address for communicating with the mobile communication device 110. Thereafter, the eavesdropping server 180 may transmit a call extender input 340 in the form of a registration request to the dispatcher 170. Knowing the SIP URL, the dispatcher 170 may then transmit commands such as a call extender input 345 directly to the mobile communication device 110 as a registration request. Such a registration request may wake the dormant call extender service on the mobile communication device 110.

When a lawful authority is prepared to eavesdrop on a particular mobile communication device involved in a "call of interest," a server operated by the lawful authority may determine whether an SIP URL is known from registration updates provided by the call extender daemon. If not, the lawful authority may initiate a registration request as described above. In this way, the lawful authority may determine where to send data packets for delivery to the mobile communication device. Such data packets may be received by a daemon on the mobile communication device for controlling resources thereon. The daemon may be integrated with the original equipment manufacturer (OEM) layer of the mobile communication device in order to be able to manipulate resources of the device. Also, the daemon should be beyond user control and visibility, such as operating within a trust zone of the mobile device processor, so that a user of the mobile communication device never becomes aware of the existence of the call extender daemon or when the daemon is active.

Another implementation may replace the need for an SIP URL by transmitting a unicast message to the mobile communication device, such as by using the device's telephone number as an address. For example, a customized short message service (SMS) message may be sent to the mobile communication device in a format that is recognized and processed in obscurity by the daemon on the device. While similar to a conventional text message, such a customized SMS message may be sent in a format so that it can be received, recognized and processed by daemon on the mobile communication device in a manner that avoids detection by a user. The silent receipt of such a message provides a way to actively conceal from a user the activation of a call extender call extender daemon and/or the adjustment of the operating state of one or more onboard resources. Employing a silently received SMS message may be useful when IP coverage is not available, such as a circuit-switched environment. Also, an SMS-based messaging system provides the advantage that it is only used when needed and may be more difficult for a user to identify as running on the mobile communication device. While conventional SMS-based messages generally trigger a sound or vibrational notification at the mobile communication device, the call extender daemon may actively block such notifications in response to receipt of a call extender input intended solely for the call extender daemon. Blocking such notifications actively conceals from the user activity by the call extender daemon.

SMS messages may also be used by the mobile communication device to send device resource status messages to the cellular network, which may be configured to route such messages to the law enforcement authority that activated the call extender daemon.

In an embodiment, the call extender daemon may be signaled (e.g., with an activation signal) by a law enforcement authority through messages placed in an overhead power control channel or loopback mechanism. This communication link is used by cellular telephone systems to control the power level of the mobile communication device transceiver. As is well known, signals are exchanged between the mobile communication network and a cell site of the cellular network about 800 times per second, and the cell site sends power-up and power-down messages in these signals to control the power level of the device's transceiver in order to maintain the quality of the wireless link. In this embodiment, a special signal that is receivable by the call extender daemon may be added into the messages exchanged via the overhead power control channel. Because the overhead power control channel is a robust communication link used to control settings in the mobile communication device and is invisible to the user, this channel is well suited for also carrying the call extender daemon signals. This embodiment may be implemented by defining a new overhead power control channel signal structure that the mobile communication device transceiver will recognize and direct to the call extender daemon when received, and that includes data/command fields that the call extender daemon can interpret.

The overhead power control channel may also be used by the mobile communication device to send device resource status messages to the cellular network, which may be configured to route such messages to the law enforcement authority (e.g., to an eavesdropping server) that activated the call extender daemon.

Figure 4:
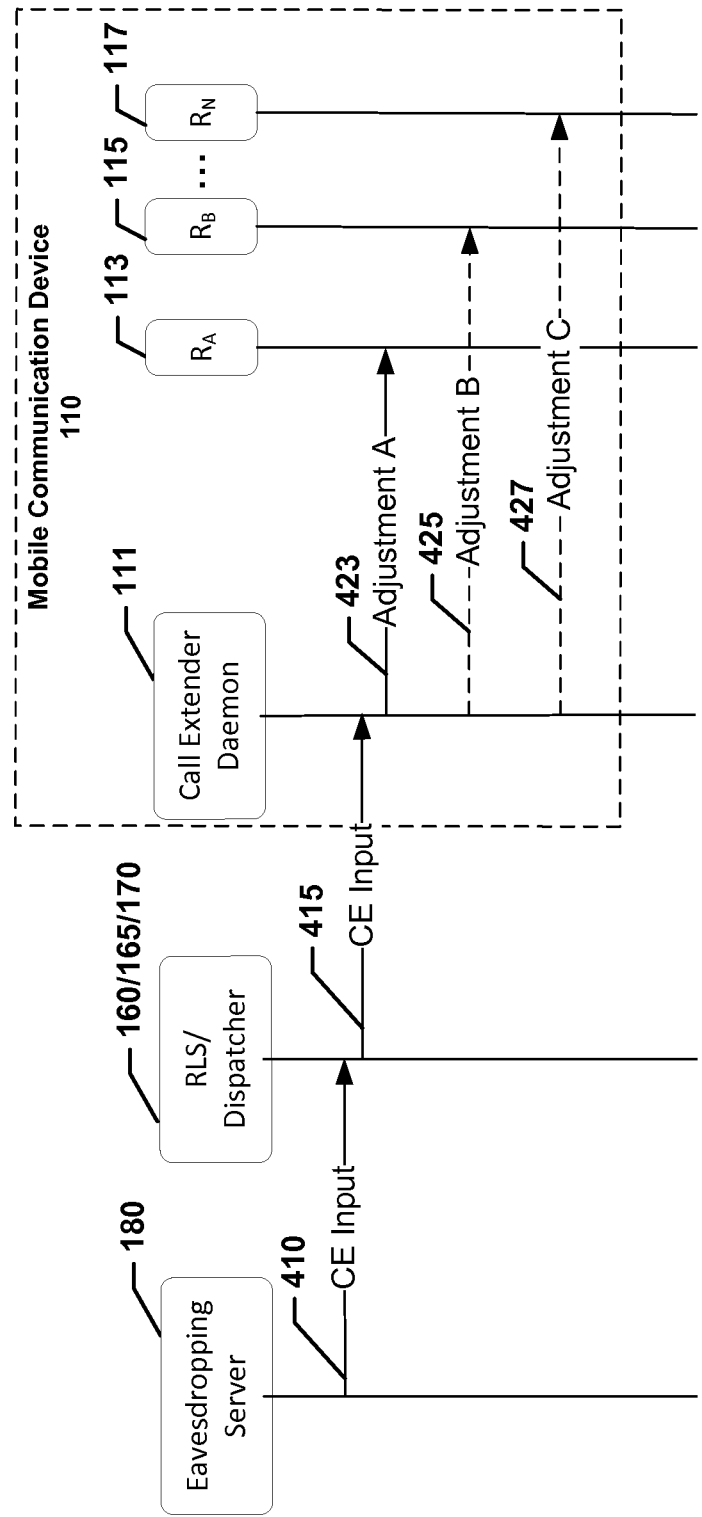
FIG. 4 is a communication flow diagram of a basic call extender daemon on a mobile communication device in accordance with various embodiments.

FIG. 4 illustrates communication flows activating and implementing a call extender daemon or call extender daemon on the mobile communication device 110. When a lawful authority decides to eavesdrop on a call of interest, an eavesdropping server 180 may be used to transmit a call extender (CE) input 410 to the mobile communication device 110 by way of network resources. The call extender input 410 may be an activation signal for the call extender daemon 111, which may remain in an inactive state until such a signal is received. The network resources may include a regional location server or dispatcher (i.e., RLS/Dispatcher 160, 165, 175), as described above. The RLS/Dispatcher 160, 165, 175 may convey the call extender input 415 to the mobile communication device 110, which may receive the input message and route it to a call extender daemon 111. The call extender daemon 111 may then execute protocols to adjust one or more of various onboard resources 113, 115, 117, such as by issuing resource adjustment commands 423, 425, 427.

The various onboard resources available for adjustment are described further below, but for illustrative purposes are represented in the communication flows as a series of onboard resources $R_A$, $R_B$ . . . $R_N$. One or more of the onboard resources 113, 115, 117 may receive adjustments from the call extender daemon 111. FIG. 4 illustrates that resource $R_A$ 113 may receive a signal containing instructions for execution of Adjustment A 423, resource $R_B$ 115 may receive a signal containing instructions for execution of Adjustment B 425, and resource $R_C$ 117 may receive a signal containing instructions for execution of Adjustment C 427 from the call extender daemon 111 for adjusting an operating state of resources. FIG. 4 shows a basic embodiment of a call extender call extender daemon that does not analyze resource usage and/or availability before making adjustments. In this embodiment, a predetermined resource allocation is executed for one or more resources as may be defined in advance. For example, resource $R_A$ 113 may be the screen display of the mobile communication device 110, and a predetermined call extender resource adjustment for the resource $R_A$ 113 may include dimming the brightness of the screen display or setting the screen display brightness to a predetermined brightness level in order to reduce the power consumed by the display, thereby extending the time the call can be maintained before the battery is drained. As another example, resource $R_B$ 115 may be a Bluetooth transceiver and resource $R_N$ 117 may be the cellular transceiver of the mobile communication device 110. In this example, a predetermined resource adjustment for the Bluetooth resource $R_B$ 115 may include turning off that Bluetooth resource, and a predetermined resource adjustment for the cellular transceiver resource $R_N$ 117 may include reducing the frequency at which the transceiver obtains location fixes and reports location fixes to the network. Like dimming the display, these predetermined resource adjustments (425 and 427 in FIG. 4) may reduce power consumption, thereby extending the time the call can be maintained before the battery is drained.

Figure 5:
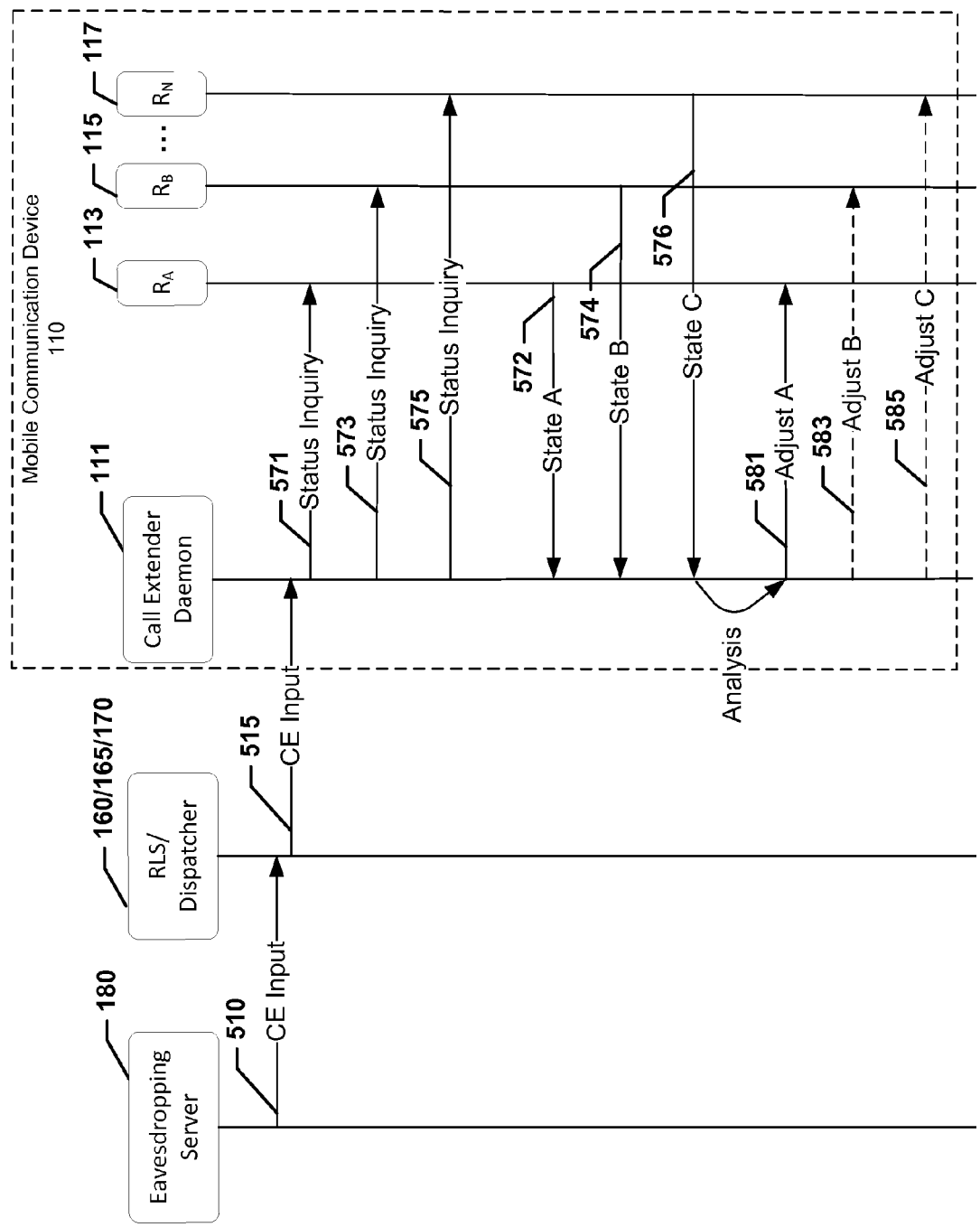
FIG. 5 is a communication flow diagram of an autonomous call extender daemon on a mobile communication device in accordance with various embodiments.

FIG. 5 illustrates communication flows for an autonomous call extender daemon on the mobile communication device 110 in an embodiment in which the device 110 determines a state of onboard resources and operating conditions (e.g., battery charge state) that it uses to select the device onboard resources to be adjusted. In this manner, a resource adjustment determination may be made by the autonomous call extender daemon based on the current state of the mobile communication device. By adjusting the operating state of onboard resources of the mobile communication device based on the device's actual operating state the autonomous call extender daemon may better adjust resources in order to increase the likelihood of maintaining an active call of interest, and avoid making adjustments when not necessary (e.g., when the battery is fully charged) in order to reduce the chance that the user might notice the adjustments.

Referring to FIG. 5, when a lawful authority decides to eavesdrop on a call of interest, an eavesdropping server 180 may transmit a call extender input 510 to the mobile communication device 110 by way of network resources RLS/Dispatcher 160, 165, 175. The network resources RLS/Dispatcher 160, 165, 175 may convey the call extender input 515 to the mobile communication device 110, which may receive the signal and route it to the call extender daemon 111. In order to determine a state of one or more of resources $R_A$ 113, $R_B$ 115, $R_C$ 117, the call extender daemon 111 may send a status query 571, 573, 575 to the various onboard resources 113, 115, 117. In response to the query, each resource $R_A$ 113, $R_B$ 115, $R_C$ 117, or an associated controller, may transmit a resource status indication 572, 574, 576 reflecting the state (States A, B, C in FIG. 5) of the resources $R_A$ 113, $R_B$ 115, $R_C$ 117, respectively. Using the one or more received resource status indications 572, 574, 576 the call extender daemon 111 may determine the state A, B, C of $R_A$ 113, $R_B$ 115, $R_C$ 117. The onboard resources most likely to be analyzed for resource adjustment are those whose further operating state is most likely to decrease the likelihood of maintaining a currently active call, such as resources unnecessarily draining the battery of the mobile communication device. Also, onboard resources likely to be analyzed are those whose operating state is most likely to increase the likelihood of maintaining a currently active call, such as the activation of redundant communication resources (e.g., a second wireless transceiver) when the mobile communication device is plugged into a vehicle's power outlet and battery drain is not a concern. Thus, a determination regarding the resource adjustments that should be made may be made by the call extender daemon 111 based on the States A, B, and C of resources $R_A$ 113, $R_B$ 115, $R_C$ 117. Depending upon the determined state the call extender daemon 111 may adjust just one resource or multiple resources. Once that determination is made, the call extender daemon 111 may send Adjust A signal 581, Adjust B signal 583, and/or Adjust C signal 585 to the respective one or more of the resources $R_A$ 113, $R_B$ 115, $R_C$ 117 to make the determined adjustments.

Figure 6:
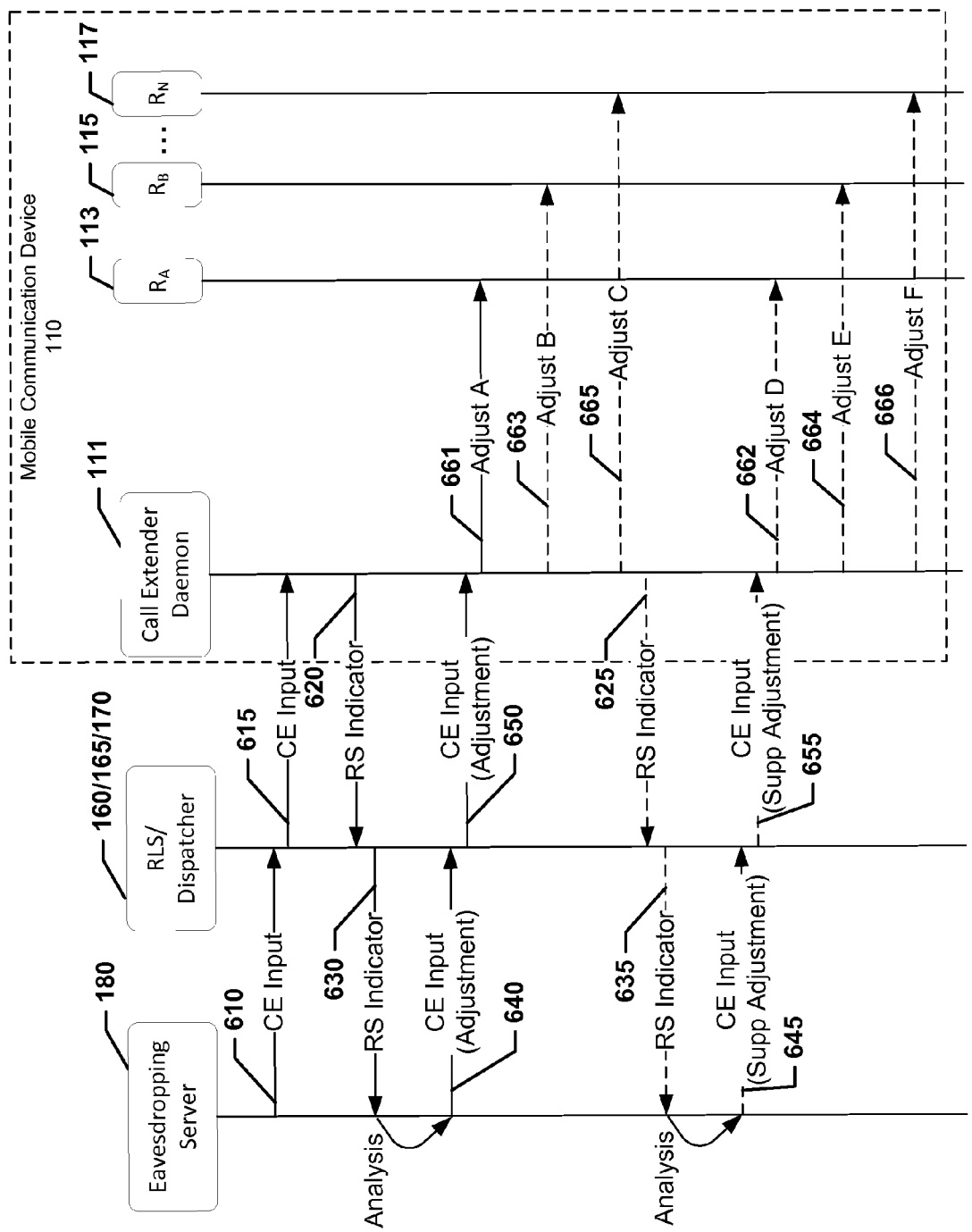
FIG. 6 is a communication flow diagram of a remote controlled call extender daemon on a mobile communication device in accordance with various embodiments.

FIG. 6 illustrates communication flows for an embodiment in which a remotely controlled call extender daemon on the mobile communication device 110 reports the device's status to an eavesdropping server 180 that uses that information to determine an appropriate resource adjustment to be made. As with the embodiments described above, when a lawful authority decides to eavesdrop on a call of interest, an eavesdropping server 180 may be used to transmit a call extender input 610 to the mobile communication device 110 by way of network resources RLS/Dispatcher 160, 165, 175. The network resources RLS/Dispatcher 160, 165, 175 may convey the call extender input 615 to the mobile communication device 110, which would be received by the call extender daemon 111. In this embodiment the call extender input 610, 615 may be an activation signal that includes a status query requesting information regarding the state of the mobile communication device 110.

In response to receiving the call extender input 615, the call extender daemon 111 activate may transmit a resource status (RS) indication message 620 reflecting a status of one or more resources of the mobile communication device. The resource status indication message 620 may characterize a state of onboard resources and a battery charge state using a simple data structure. The information in such a transmission is referred to herein as a "resource status indication." In an embodiment, a resource status indication message 620 may only be sent in response to receiving a call extender input 615, which may occur when an active call has been identified as a call of interest for a lawful intercept.

Although not shown in FIG. 6, the call extender daemon 111 may poll one or more of the onboard resources $R_A$ 113, $R_B$ 115, $R_C$ 117 to obtain the current state of those resources as described above with reference to FIG. 5, and included the obtained state information in the resource status indication message 620. Alternatively, the resources $R_A$ 113, $R_B$ 115, $R_C$ 117 may periodically update the call extender daemon 111 with state information that may be included in the resource status indication message 620. Such periodic updates of status information may be made only when the mobile communication device 110 is actively on a voice or video call or is initiating a voice or video call (e.g., receiving a phone number input from the user).

In a further embodiment that is not illustrated in the figures, the call extender daemon 111 may always be active or may remain active for a period of time after being activated (e.g., by a call extender message), and transmit the resource status indication message 620 to an eavesdropping server on a periodic basis or in response to event-based triggers. Thus, in this embodiment, the transmission of the resource status indication message 620 may not necessarily be in response to receipt of a call extender input 615.

The network resources RLS/Dispatcher 160, 165, 175 may convey the resource status indication message 620 back to the eavesdropping server 180. The eavesdropping server 180 may use the information in the resource status indication message 620 to analyze the states of the device's onboard resources $R_A$ 113, $R_B$ 115, $R_C$ 117, and determine an appropriate resource adjustment that should be implemented based on the determined device state. The specific resource adjustment that is appropriate in a given situation may depend not only on the mobile communication device's resource state and battery charge state, but also upon the goals and procedures of the lawful intercept. The determined appropriate resource adjustment may then be transmitted by the eavesdropping server 180 back to the mobile communication device 110 in the form of a continue trigger 640 by way of network resources RLS/Dispatcher 160, 165, 175. The CE trigger 640 may include instructions for what resources should be shutdown and/or altered. Those instructions may be in a simple data structure format such as session description protocol (SDP), which is a sub protocol of SIP. The network resources RLS/Dispatcher 160, 165, 175 may transmit a call extender trigger 650 to the call extender daemon 111. The call extender daemon 111 may send Adjust A signal 661, Adjust B signal 663, and/or Adjust C signal 665 to the respective one or more of the resources $R_A$ 113, $R_B$ 115, $R_C$ 117 to make the determined adjustments.

The eavesdropping server 180 may also transmit correction or update instructions for resource allocation to the mobile communication device 110. Such correction/update instructions may take into account circumstances particular to the call of interest. Also, such a correction/update may be warranted in response to receiving resource status indication updates reflecting a change in resource status. Thus, the call extender daemon 111 may transmit a supplemental resource status indication message 625 to the network resources RLS/Dispatcher 160, 165, 175 reflecting a status or change of status of one or more resources of the mobile communication device. Such a transmission may occur periodically, in response to threshold levels of resource changes, at intervals identified by the eavesdropping server 180, in response to events on the mobile communications device, or in response to other criteria. The network resources RLS/Dispatcher 160, 165, 175 may convey a supplemental resource status indication message 635 back to the eavesdropping server 180. After another round of analysis, another determined resource adjustment may be transmitted by the eavesdropping server 180 back to the mobile communication device 110 in the form of a supplemental call extender trigger 645 by way of network resources RLS/Dispatcher 160, 165, 175. A relayed supplemental call extender trigger 655 may be transmitted by the network resources RLS/Dispatcher 160, 165, 175 to the mobile communication device, which passes the message to the call extender daemon 111. The call extender daemon 111 may send Adjust A signal 662, Adjust B signal 664, and/or Adjust C signal 666 to the respective one or more of the resources $R_A$ 113, $R_B$ 115, $R_C$ 117 to make the determined adjustments.

Figure 7:
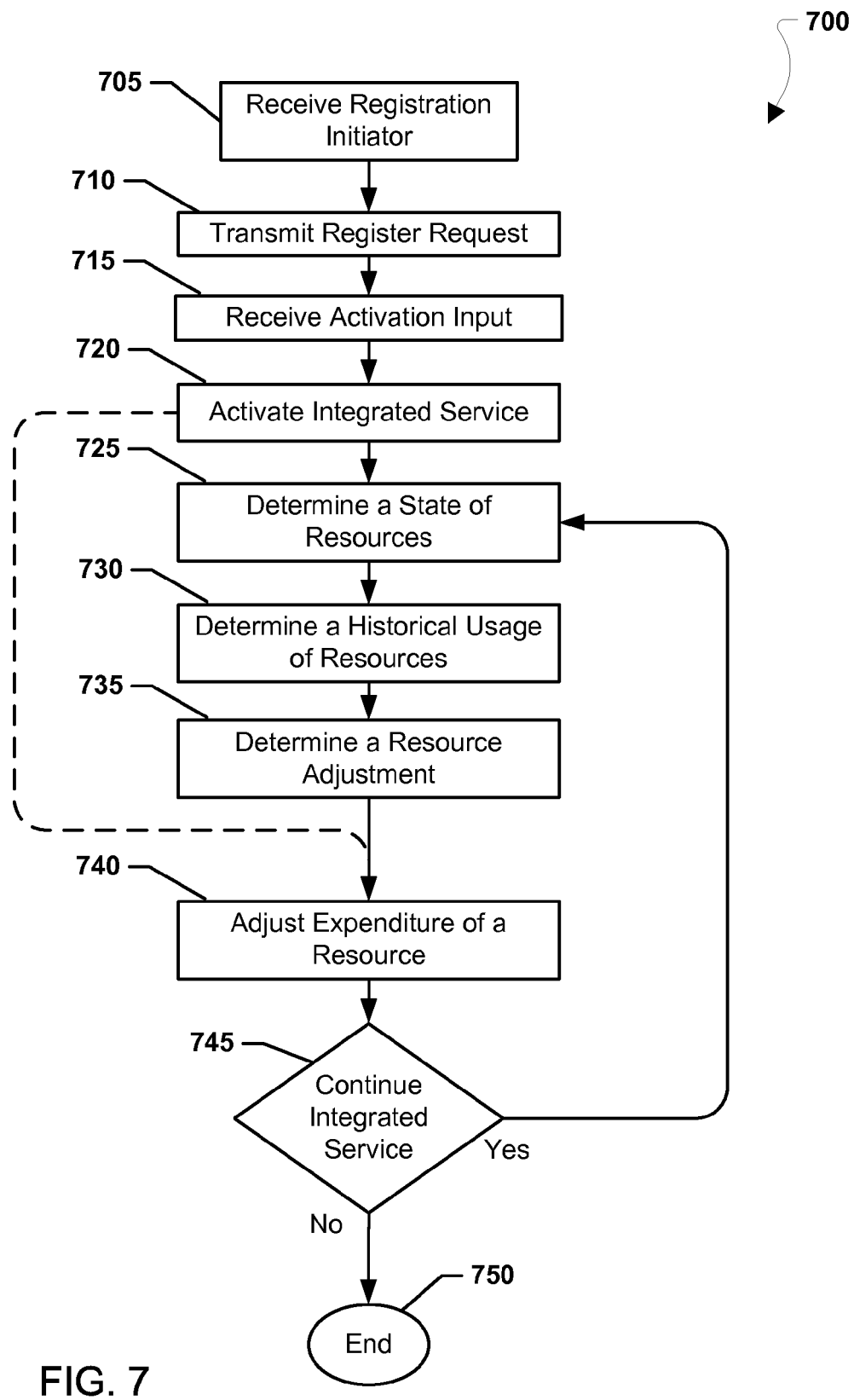
FIG. 7 is a process flow diagram illustrating an embodiment method that may be implemented by autonomous call extender daemon on a mobile communication device.

FIG. 7 is a process flow diagram illustrating an embodiment method 700 for dynamically adjusting mobile communication device resources for maintaining calls during a lawful intercept. The method 700 relates to process activities from the mobile communication device perspective and may be performed by a device processor configured with processor-executable instructions to execute a call extender daemon adapted to receive and execute protocols described above for increasing the likelihood of maintaining an active call on the mobile communication device.

In block 705 the processor executing the call extender daemon may receive a registration initiator message. The registration initiator message may have a data structure that is recognizable by the call extender daemon. The registration initiator message may activate a registration mode of the call extender daemon, which may have been previously dormant on the mobile communication device processor. Receipt of the registration initiator message by the mobile communication device may be concealed from a user of the mobile communication device so that audio, visual and/or vibrational outputs normally generated by the mobile communication device in response to receiving similar inputs may be suppressed. The source of the registration initiator message may be a remote server, such as an eavesdropping server. Alternatively, the source of the registration initiator message may be a remote resource or on board resource to which the call extender daemon is programmed to react. For example, receipt of a phone call or unicast message from a predetermined source may act as a registration initiator message. Similarly, a time-based or event-based algorithm within the call extender daemon or other processor-executable instructions configuring the device processor may generate such a registration initiator.

In block 710 a register request may be transmitted by the processor executing the call extender daemon from the mobile communication device. The register request may be adapted to provide a remote resource, such as a local or eavesdropping server, with an end point address for delivery of commands to the call extender daemon executing on a processor of the mobile communication device. Additionally, the register request may provide a remote resource with additional information (e.g., access codes) enabling later delivery of commands for the call extender daemon executing on the device processor.

In block 715 an activation input may be received by the processor executing the call extender daemon. The activation input may be a form of call extender input intended to activate the call extender daemon for adjusting an operating state of onboard resources in order to increase the likelihood of maintaining an active call. Upon receipt of the activation input, in block 720 the processor executing the call extender daemon may begin the process of making the appropriate resource adjustment.

In one embodiment the processor executing the call extender daemon may not perform resource analysis and may only execute predetermined adjustments to onboard resources in block 740. In this embodiment, the processor executing the call extender daemon may end the processor or await further activation inputs.

In an embodiment in which the processor executing the call extender daemon determines resource adjustments to be made based on resource states, the processor may determine a state of onboard resources of the mobile communication device block 725. The state of onboard resources may reflect the current condition, operating state or status of one or more onboard resources of the mobile communication device. The state may represent a level of current use, current or future limits on use, available capacity, total capacity, availability and any other factors relating to the condition of onboard resource. This determination may be may by the processor executing the call extender daemon issuing a query to one or more resources, or accessing a database that records the current state.

This determination of the resource or resources that is/are in use and/or available on the mobile communication device may be used by the processor executing the call extender daemon to automatically determine the resources that are available for use and/or a current level of the use of such resources. This autonomous process may minimize the amount of handshaking between a network and the mobile communication device. Also the processor executing the call extender daemon may perform the resource analysis continuously or only in response to receipt of an activation input (i.e., indicating a call of interest is active).

In block 730 the processor executing the call extender daemon may determine a historical usage pattern of one or more of the onboard resources. Such a determination may be based on the state information determined in block 725. The analysis for determining a resource adjustment may be based on user history and/or heuristic analysis. Such historical usage patterns may include information about what onboard resources are regularly used or checked by the user. In circumstances where onboard hardware or services are going to be turned off, consideration should be given as to whether the user is using such services. For example an e-mail client may ping a server every 15 minutes, which can be used as a history of client behavior. Thus, if the client is checking for e-mail more often, then the algorithm may not want to alter e-mail pinging.

Similarly, if a prior resource adjustment dims the screen of the mobile communication device, but the user immediately changes settings back to their original brightness, such a user reaction may be notable. In such a circumstance, adjusting screen brightness may be avoided if and when further resource adjustments need to be made. Further, if a Bluetooth connection active on the mobile communication device has not recently been used in such a resource is a prime target to be turned off by the call extender algorithm. In this way, historical usage patterns may be used as part of the determination as to whether a particular resource output should be adjusted.

In block 735 the processor executing the call extender daemon may determine a resource adjustment to be made based on the state of onboard resources determined in block 725, which may involve a resource analysis. Depending on the circumstances only one resource may need adjustment or multiple resources may need adjusting. The determined resource adjustment may include a first resource adjustment to one onboard resource and a second different resource adjustment to another onboard resource. Also, one resource may need more than one type of adjustment. For example, a first resource adjustment may involve turning a particular transceiver on, while a second resource adjustment may involve changing the frequency with which that transceiver searches for or emits a signal.

A resource analysis may involve determining whether a screen or camera is on; some type of polling usage of the network is active; and determining the current charge state of the battery. A resource analysis may determine that a device is plugged into a power source, thus providing virtually infinite power, in order to enhance tracking of the device. Alternatively, if a current onboard power reserve (i.e. the onboard battery power level) is extremely low. Such a critically low battery circumstance may warrant not activating additional tracking resources, in order to ensure the onboard power reserve is quickly replenished. If the phone is plugged in, for tracking purposes its traceability can be improved by increasing the frequency of location fixes. A further resource analysis relating to the frequency of location fixes is described below with regard to FIG. 11 and FIG. 12.

The resource analysis may also take into account a determined most critical factor that lead to a call being dropped. In this way, if the mobile communication device is not moving or has not been moving for some time and the communication connection is strong, then a call drop from conductivity may not be assessed as a critical factor. Alternatively, where conductivity is questionable and the device is plugged-in, then redundant call connections may be appropriate.

The resource analysis may also pick up on cues from the user of the mobile communication device, either current or historical. These cues may come from actions taken by the user, such as reverting to a pre-call extender configuration. Alternatively the cues may be verbal cues from the user commenting about configuration changes they may have detected. Such verbal cues may require speech recognition algorithms to be implemented. For example, expressions such as "screen" and "dimmer" in close proximity to one another may reflect the possibility of user detection of the call extender daemon if the screen was dimmed as part of the resource adjustments. Alternatively, active commands may be transmitted from the eavesdropping server in response to the verbal cues detected from the context of the conversation that is taking place as part of the call of interest. The eavesdropping server may have access to more advanced speech recognition software or even input from human agents actively listening to a call. In this way the eavesdropping server may transmit correction/adjusted instructions for alternative resource allocation.

If the user is on a video call, which requires a lot of power, the processor executing the call extender daemon may determine in block 735 that a video resource parameter, such as the frames per second of the video, may be altered in order to conserve power. Thus, instead of a 30 frames per second refresh rate that can perhaps be reduced to 10 or 15 frames per second. The user may attribute this adjustment to network problems, rather than a foreign application running on their device, which is thus helpful to avoid detection. Alternatively, a different codec may be employed on the mobile communication device for power conservation.

In block 740 the processor executing the call extender daemon may initiate the determined resource adjustment determined in block 735. The adjustment of the operating state of multiple resources may occur simultaneously, in consecutive series or some other structured order. The processor executing the call extender daemon may determine whether further adjustments may be made by determining whether the call extender daemon should continue in determination block 745. If the processor executing the call extender daemon determines that the call extender daemon should continue or further adjustments are appropriate (i.e., determination block 745="Yes"), the processor may return to determining a state of device resources in block 725. If the processor executing the call extender daemon determines that the call extender daemon should not continue (i.e., determination block 745="No"), the processor may end the call extender daemon in block 750.

The resource adjustment determined in block 735 may be any of a variety of resource adjustments that may affect the likelihood and/or manner of maintaining a call active. Resource operating states may adjusted, such as turned off or reduced in power, to reduce battery drain and thus reduce the chance of dropping the call by expending the battery. Alternatively, additional resources may be activated in order to increase the likelihood of maintaining a call. For example, if the mobile communication device is being charged and thus not at risk of draining the battery, the resource adjustments may include activating additional transceiver resources or increasing a frequency of location fixes to help maintain a call.

Additionally, the processor executing the call extender daemon may use intelligence algorithms to respond to user reactions to resource adjustments in order to reduce the chance of detection. For example, if a user changes a resource allocation back to a pre-call extender trigger level, such as turning the screen brightness up after it has dimmed, the processor executing the call extender daemon not adjust the screen brightness again. Thus, the processor executing the call extender daemon may monitor user behavior/reaction in response to resource adjustment and respond to the user reactions in order to avoid detection. Such user monitoring may access historical uses or current uses of resources.

Redundant data streams may be set up in order to help preserve the continuity of a call of interest. For example, a circuit-switched call may have a redundant call connection simultaneously set up on Wi-Fi if available by the processor executing the call extender daemon. In this way if the circuit-switched call is dropped such as because of a fade, the Wi-Fi connection can resume the call seamlessly. This may include turning Wi-Fi on in a "ghost mode" which does not show the Wi-Fi icon to the user (i.e., icon suppression). Potentially, a network infrastructure can push Wi-Fi pass keys to the mobile communication device so that it may have access to Wi-Fi networks it would not otherwise. For example, the eavesdropping server may have Wi-Fi access codes such as for a particular hotel from which the call originates that may be pushed to the mobile communication device to allow access to the hotel's Wi-Fi network.

Additionally, the processor executing the call extender daemon may actively conceal from the user the fact that adjustments of the operating state of one or more onboard resources has been made. For example, although a Wi-Fi transceiver may have been turned on or off as part of the resorts adjustment, the Wi-Fi icon normally displayed on a user interface may remain unchanged in order to conceal the resource adjustment from the user.

Once an adjustment of resources is performed, a determination as to whether to continue the call extender daemon may be made in determination block 745. If further resource adjustments may be performed or need to be performed (i.e., determination block 745=Yes), then the process may return to block 725 to once again determine a state of resources before determining further resource adjustments. Otherwise, if a determination is made that the call extender daemon should not continue (i.e., determination block 745=No) the call extender daemon may end at 750.

Figure 8:
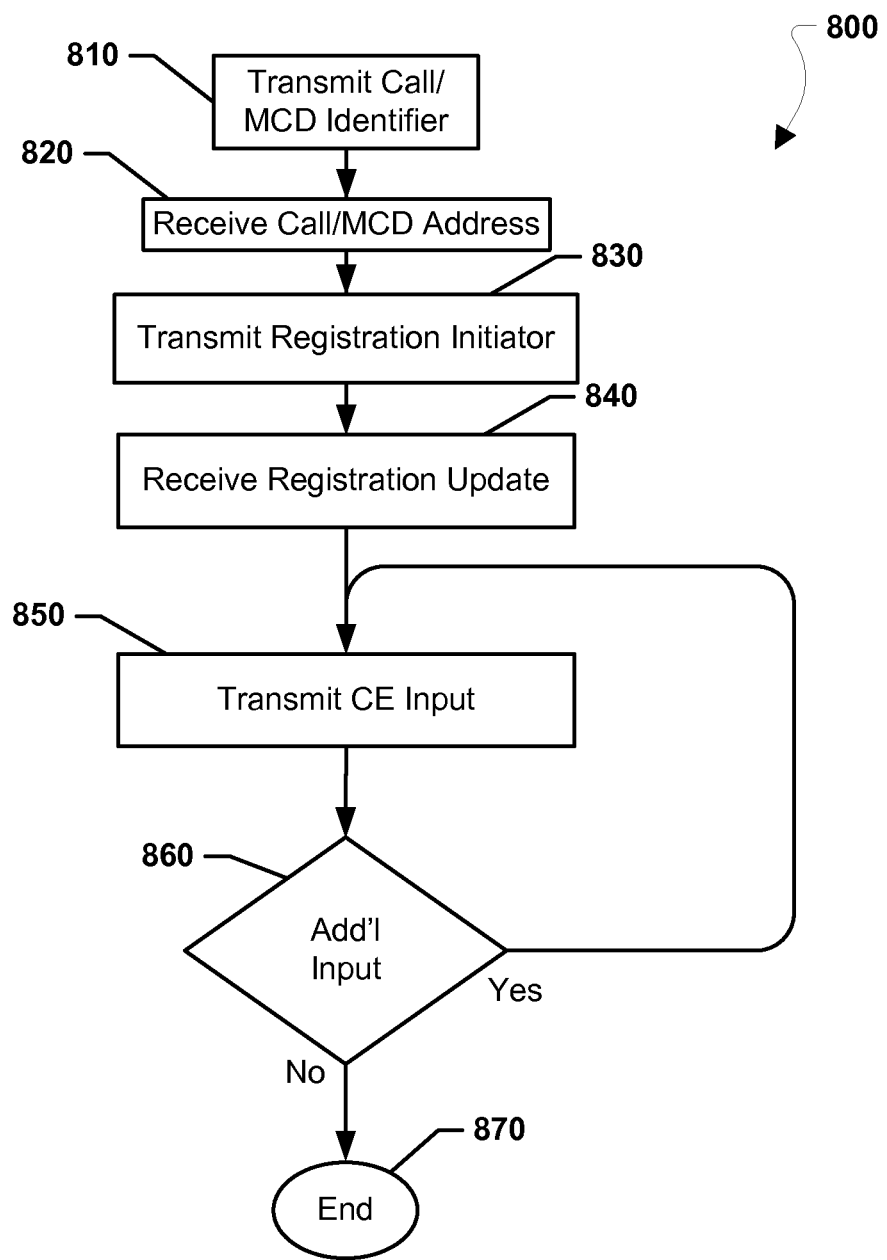
FIG. 8 is a process flow diagram illustrating a remote server activating an autonomous call extender daemon on a mobile communication device in accordance with various embodiments.

FIG. 8 is a process flow diagram illustrating an embodiment method 800 of dynamically adjusting mobile communication device resources for maintaining calls during a lawful intercept. The method 800 relates to process activities from a server perspective, such as from the home or local dispatcher server. In block 810 the server may transmit a call/MCD identifier 810 to a regional location server or intermediate server in order to receive an indication of the IP route of a call of interest, and particularly an endpoint address of a target mobile communication device. In block 820 the server may receive a response including an address of the call or mobile communication device identified in block 810. The call/MCD address may be an IP address such as an SIP URL, which can be used for delivery of commands to a target mobile communication device or call of interest.

Using the received address for delivering commands to the mobile communication device, the server may transmit a registration initiator in block 830. This transmission may be through a cellular telephone network and one or more intermediate servers in order to reach the mobile communication device, but may take a different route from that of the transmission of the call/MCD identifier in block 810. In response to the registration initiator transmission the server may receive a registration update in block 840. The registration update may reflect an active SIP URL, provide access codes or other information needed to control a target mobile communication device. The server may use this information to transmit a call extender (CE) input in block 850, such as an activation input in order to activate a call extender daemon on the mobile communication device. If further input needs to be provided to the mobile communication device (i.e., determination block 860="Yes"), server may transmit another call extender input in block 850, such as an input including resource adjustment instructions or codes. Otherwise, if the server determines that no further input need be provided to the mobile communication device (i.e., determination block 860="No") the server may end the process may end at 870.

Figure 9:
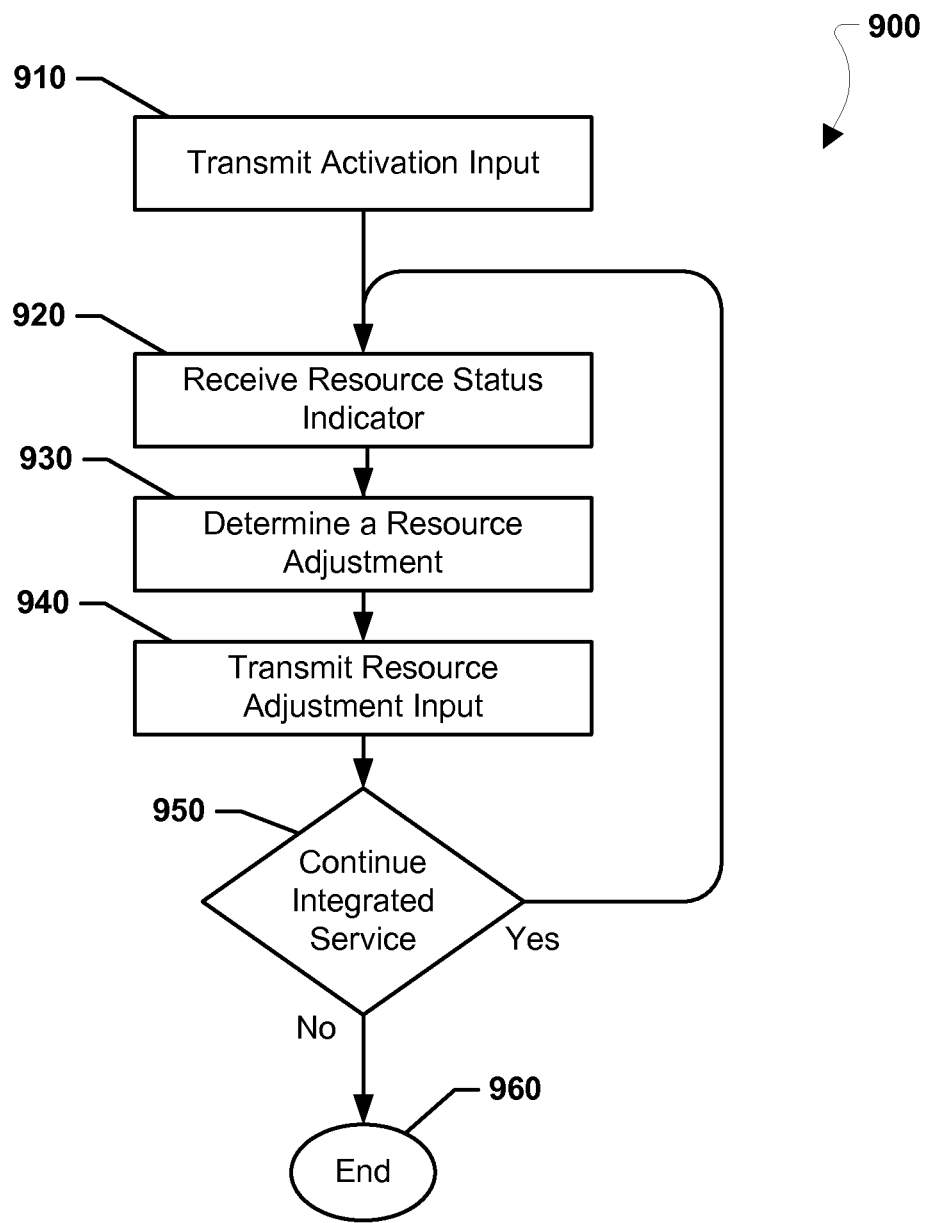
FIG. 9 is a process flow diagram illustrating a remote server controlling a call extender daemon on a mobile communication device in accordance with various embodiments.

FIG. 9 is a process flow diagram illustrating an embodiment method 900 of dynamically adjusting mobile communication device resources for maintaining calls during a lawful intercept. The method 900 relates to process activities from a server perspective similar to method 800, but further includes device resource state analysis performed by the remote server. In block 910 the server may transmit an activation input to the mobile communication device as described above. The activation input transmitted in block 910 may be configured to request resource information from the mobile communication device. In block 920 a resource status indication may be received by the server. In block 930 the server may use the received resource status information to determine a resource adjustment for the mobile communication device in order to increase the likelihood that a current call will be maintained. The resource adjustment determined by the server in block 930 may be use additional resources available to analyze the device resource state information, including historical usage information about usage by the user. The server may send to the mobile communication device the determined resource adjustment for one or more resources of the mobile communication device as a resource adjustment input in block 940. Such resource adjustments may identify the specific adjustments to be made to one or more onboard resources and may include additional details such as the timing and sequence of such adjustments.

The server may determine whether to continue communicating with the call extender daemon in determination block 950. If the server determines that further resource adjustments need to be performed (i.e., determination block 950=Yes), the server may receive further state information regarding resources of the mobile communication device in block 920 and repeat the operations of determining further resource adjustments. If the server determines that further resource adjustments need not be performed (i.e., determination block 950=No) the server may cease further transmission to the mobile communication device.

Figure 10:
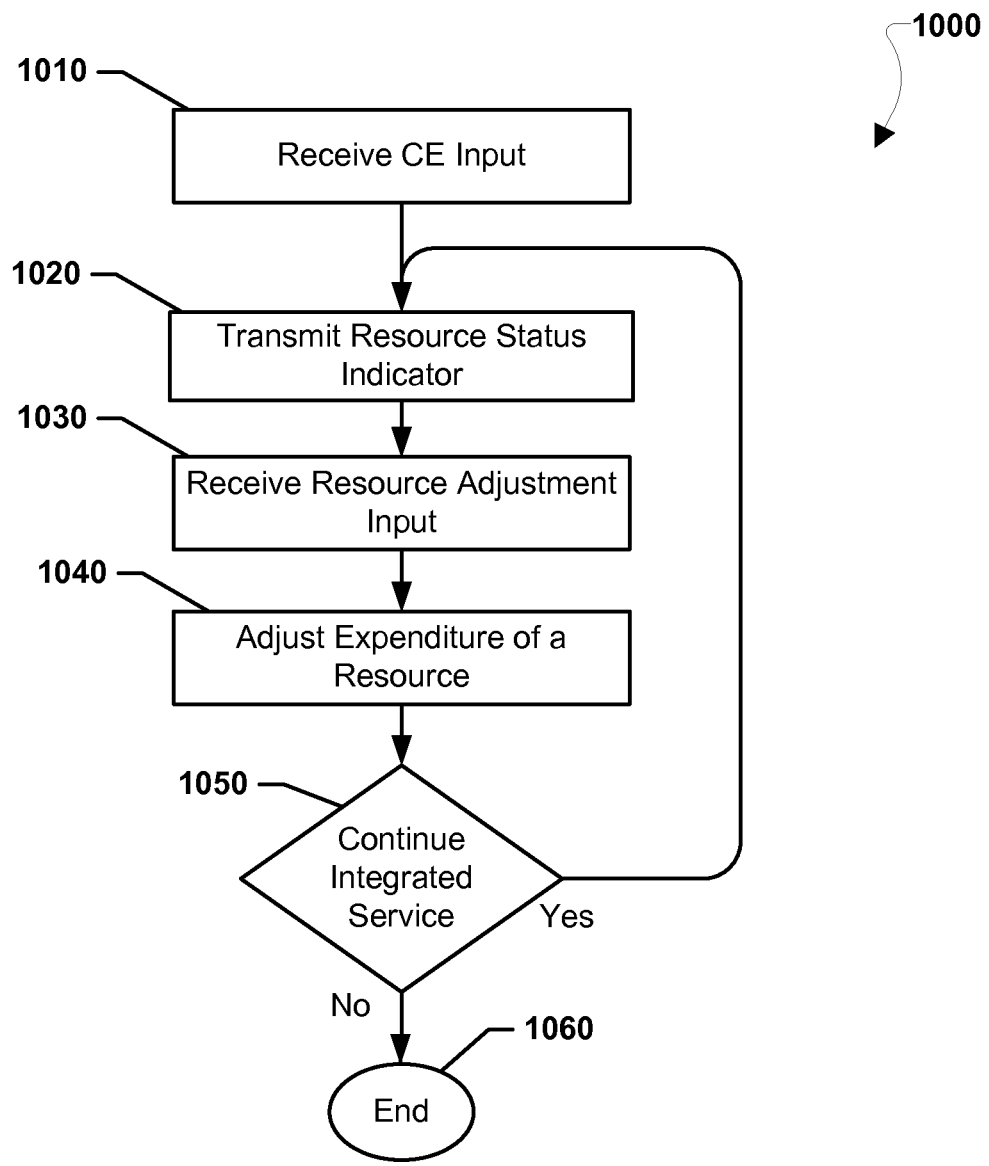
FIG. 10 is a process flow diagram illustrating another remote controlled call extender daemon on a mobile communication device in accordance with various embodiments.

FIG. 10 is a process flow diagram illustrating an embodiment method 1000 of dynamically adjusting mobile communication device resources for maintaining calls during a lawful intercept. The method 1000 relates to process activities from the mobile communication device perspective, but with remote analysis of resources being performed for identifying resource adjustments. As described above, the mobile communication device includes a processor configured with processor-executable instructions to execute a call extender daemon adapted to receive and execute protocols designed to increase the likelihood of maintaining an active call on the mobile communication device. In block 1010 a call extender input may be received from a server at the mobile communication device. The call extender input may represent an activation input as described above, or a different input such as one requesting state information from the mobile communication device. It should be noted that prior to the receipt of this call extender input the mobile communication device may have received and responded to registration requests to register the call extender daemon a described above.

In response to receiving the call extender input the processor executing the call extender daemon may transmit one or more resource status indications to a requesting server or some other destination as appropriate in block 1020. The processor executing the call extender daemon may receive a resource adjustment input in block 1030. The processor executing the call extender daemon may use the resource adjustment input to adjust the operating state of one or more onboard resources of the mobile communication device in block 1040. The remote resource analyses included in method 1000 may be used as an add-on to an autonomous or semi-autonomous call extender call extender daemon. In this way, the mobile communication device may initially activate some preliminary automatic resource adjustments, and then await receipt of further resource adjustment instructions from the remote server in block 1030. As a further alternative, the mobile communication device may perform its own resource analysis and corresponding adjustments, but also accept a verification of those adjustments or supplemental adjustment instructions from a remote server.

When an adjustment of resources is performed, the processor executing the call extender daemon may determine whether to continue the call extender daemon in determination block 1060. If the processor executing the call extender daemon determines that further resource adjustments may be performed or need to be performed (i.e., determination block 1060=Yes"), the processor may again transmit a current state of resources in block 1020. f the processor executing the call extender daemon determines that the call extender daemon should not continue (i.e., determination block 1050="No"), the processor may end the call extender daemon in block 1060.

There may be a number of different onboard resources $R_A$, $R_B \ldots R_N$ of the mobile communication device available for adjustment, include hardware and software components. The battery of a mobile communication device is a resource critical to the continuing operation of the device. Although the battery may not be adjusted, other resources may be adjusted to prevent that battery from being unnecessarily drained during a call subject to a lawful intercept. For example, the display screen on a mobile communication device generally consumes a significant amount of power, so dimming the display screen can conserve energy stored in the battery for use in maintaining a call. However, dimming the screen on a mobile communication device may be noticed by a user and thus may be avoided under certain circumstances as a resource adjustment option. Other resources that can be adjusted or deactivated to conserve battery power include radios of the mobile communication device, such as a cellular transceiver (e.g., when the call is handled as a voice-over-IP call using WiFi), a global positioning system (GPS) receiver, a WiFi transceiver, a Bluetooth® receiver, a near-field communication (NFC) transceiver, and other transceivers.

Another resource adjustment that may be made involves changing the way position fixes are obtained and/or reducing the frequency at which the mobile communication device determines and reports its position to the network. Government agencies require that voice communication services comply with lawful tracking by mobile communication devices providing regular location fix information. Such location fix information generally requires latitude/longitude information determined using GPS services. However, obtaining a location fix too often causes excessive battery drain and obtaining a location fix sporadically may result in a stale or obsolete location fix. Also, there may be extraneous circumstances that cause location fix attempts to fail (e.g., platform issues, unable to determine location, temporary fading, signal blockage such as in a tunnel, temporary network outages, etc.), requiring additional fix attempts. Thus, in accordance with an embodiment a resource analysis may consider additional gathered information from the mobile communication device for determining one particular resource adjustment such as the frequency of location fixes. The analysis may consider multiple factors in order to interpolate or extrapolate an expected location and movement of a mobile communication device. When the location of the mobile communication device may be predicted with a level of certainly through a low-cost analysis, it may reduce the need to use GPS to obtain a location fix.

Figure 11:
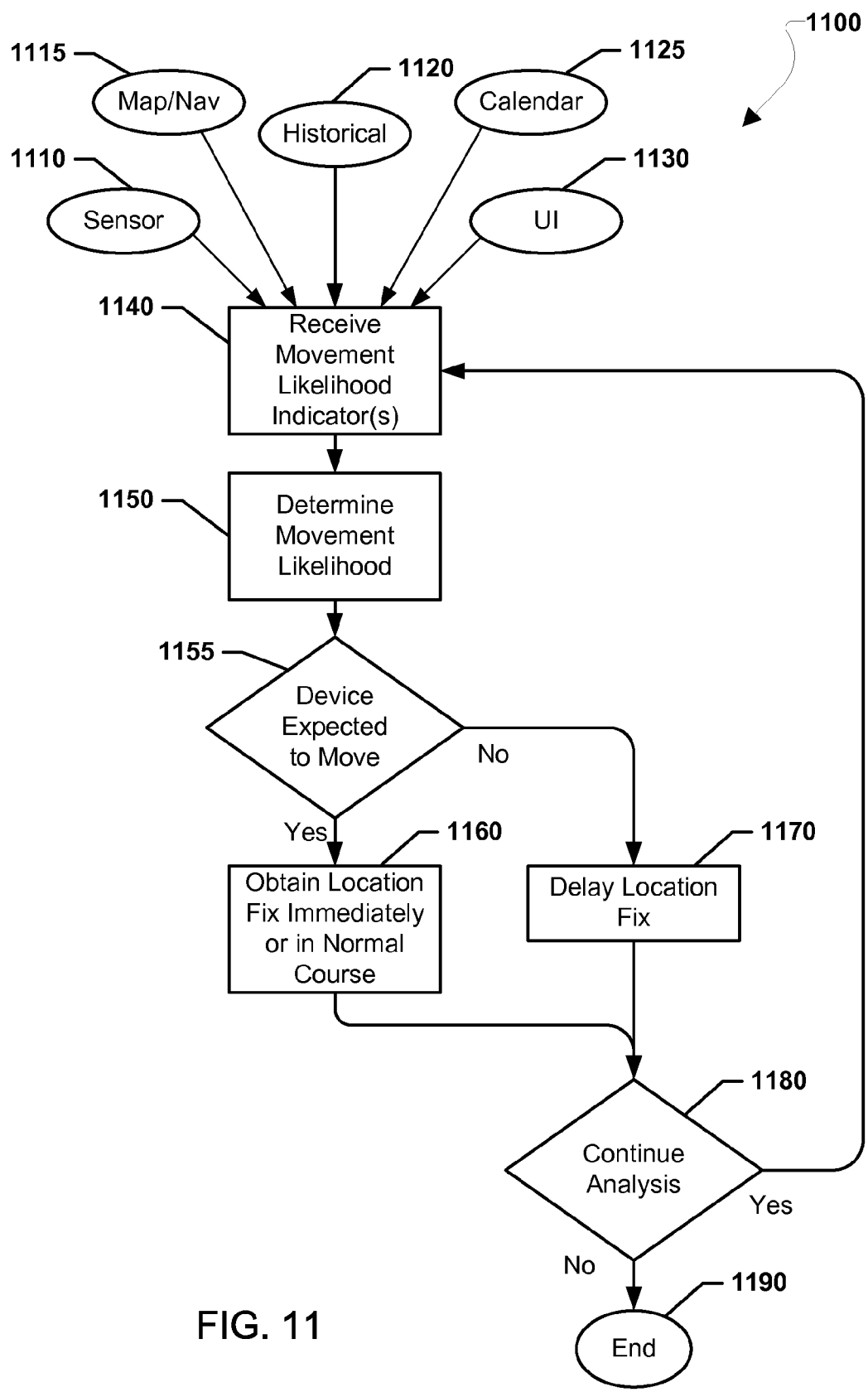
FIG. 11 is a process flow diagram illustrating an analysis of intelligence gathered by a call extender daemon on a mobile communication device in accordance with various embodiments.

FIG. 11 is a process flow diagram illustrating various elements of information that may be gathered to compile position-related information that may be used to determine the location of a mobile communication device. The gathered position-related information may be used as part of an analysis to determine whether the resource operating state required to attempt a location fix may be avoided. The gathered position-related information may be obtained from onboard information already on the mobile communication device, but perhaps not traditionally used to locate that device. FIG. 11 includes several examples of position-related information gathering sources including a sensor 1110, map/navigational program 1115, historical data 1120 regarding movement of the device, a calendar program 1125 or even user interface (UI) 1130. Also, additional position-related information gathering sources may be considered and/or used, such as an information supplied by the cellular network (e.g., current cell ID), current time, traffic inputs, and messaging inputs. Sensors 1110 of various sorts may provide useful position-related information, such as whether the mobile communication device is moving or stationary. A map/navigation program 1115 may be in the process of giving a user directions to a destination, thus being able to predict the path that the mobile communication device will travel. Historical data 1120 regarding movement of a user's mobile communication device, particularly considering the time of day (i.e., a clock function) and the day of the week (i.e., a calendar program 1125), may be helpful. For example, a user may take the same route to and/or from work or a health club every day. Such routine information may be used to predict a travel route with a certain degree of confidence. Also, a user's calendar program 1125 may contain appointment information that can be used to determine where the user is likely heading if the time for that appointment is approaching Additionally, the user may simply enter destination or location information into a user interface (UI) 1130, perhaps being prompted by the call extender daemon made to look like a common function of the mobile communication device. One or more of such information gathering sources may provide movement and/or likelihood position indications from the information they have stored or from which they have access.

In block 1140 the processor executing the call extender daemon may receive the movement likelihood indications from any available onboard sources, may use the information to determine a movement likelihood of the mobile communication device in block 1150. The movement likelihood indications may reflect the mobile communication device is more likely than not (e.g., 51% or greater chance) to move before an end of a current interval between location fixes. Alternatively, a higher or lower degree of accuracy regarding the likelihood of movement may be used. Also, the processor executing the call extender daemon may determine a reliability factor of the gathered position-related information. Thus, the processor executing the call extender daemon may use the gathered position-related information to determine whether, when or how often to obtain new location fixes in response to a reliability factor exceeding a reliability threshold. The intervals between location fixes, including a current interval, may be defined by a predefined frequency for obtaining location fixes. Further, the reliability factor may be enhanced by a dynamic tolerance. The dynamic tolerance may be based on an importance that the current call of interest be maintained by the mobile communication device balanced against a precision requirement of the new location fix.

If the processor executing the call extender daemon determines that the mobile communication device is expected to move (i.e., determination block 1155="Yes"), the processor may immediately obtain a new location fix or obtain a location fix in the normal course of time in block 1160. In this way, a new location fix may be obtained during a current interval between consecutive scheduled location fix requests. That new location fix may be obtained in response to determining the mobile computing device is expected to move based on the movement likelihood indication(s). Otherwise, if the processor executing the call extender daemon determines that the mobile communication device is not expected to move (i.e., determination block 1155="No"), the processor may delay the process of obtaining a new location fix in block 1170. The delay may be for another interval or some other length of time determined from the gathered information. Regardless of whether the location fix was delayed in block 1170 or obtained in block 1160, the processor executing the call extender daemon may determine whether further analysis is needed in determination block 1180. If the processor executing the call extender daemon determines that no further analysis is needed (i.e., determination block 1180="No"), the processor may terminate the call extender daemon in block 1190. If the processor executing the call extender daemon determines that further analysis is needed (i.e., determination block 1180="Yes"), the processor may receive additional movement likelihood indications in block 1140 before again determining a movement likelihood in block 1150.

Figure 12:
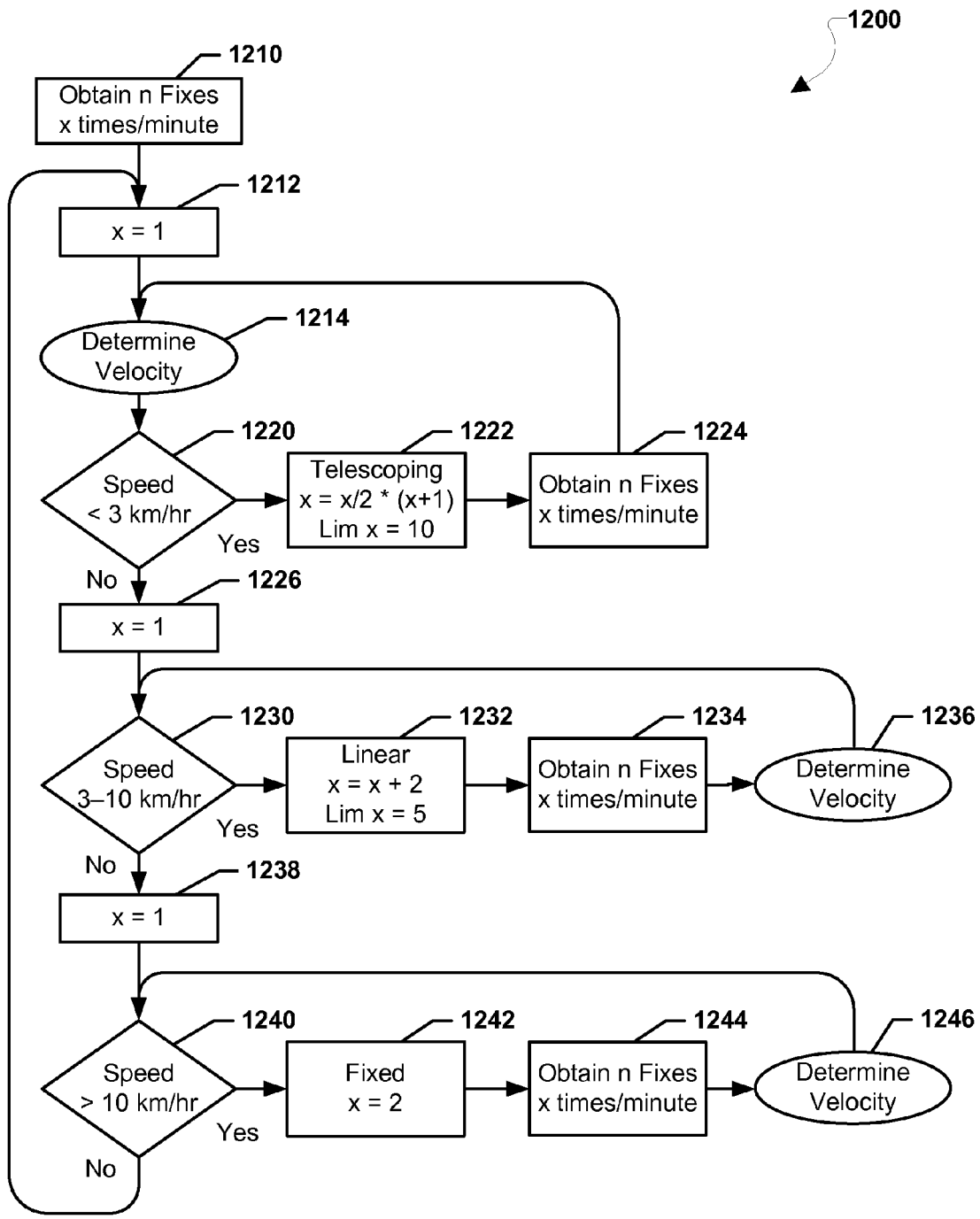
FIG. 12 is a process flow diagram illustrating a method of adjusting resources of a mobile communication device in accordance with various embodiments.

FIG. 12 is a process flow diagram illustrating how a radio resource may be adjusted for maintaining a call of interest during a lawful intercept. Generally, a mobile communication device will obtain a predetermined number (n) of location fixes at a regular frequency. That frequency may be measured as a number of times (x) a location fix is attempted over a set period of time, such once a minute. In order to conserve power in a mobile communication device, the frequency for obtaining fixes may be reduced in circumstances where it is appropriate, such as when other location information is available so that when gathered information indicates a location fix may not be required, such as when the mobile communication device is stationary. Thus, a measure velocity of the mobile communication device may be useful for varying the frequency of location fixes.

A mobile communication device will generally have a default frequency value for obtaining location fixes. Before an adjustment in fix taking frequency is implemented, the mobile communication device may be taking position fixes at the default frequency in block 1210. In block 1212, the processor executing the call extender daemon may set the frequency x at one and a current velocity determination may be made in block 1214. The current velocity reflects a change in at least one of a direction and a speed of the mobile computing device. The velocity determination may be made from measurements registered by the mobile communication device, such as from the gathered position-related information. If the processor executing the call extender daemon determines that a speed of the mobile communication device is less than 3 km/hr, for example, (i.e., determination block 1220="Yes"), the processor may presume that the mobile communication device is either stationary or not moving very fast. Thus, the processor executing the call extender daemon may apply a telescoping function to change the location fix frequency in block 1222. In particular, the processor may change the frequency x by the function x=x/2*(x+1). An upper limit on the location fix frequency (i.e., Lim x=10) may be included in the telescoping function in block 1222 to ensure the frequency of location fixes remains within an appropriate limit. In block 1224, the processor executing the call extender daemon or another processor or resource on the mobile communication device may obtain the set number n of location fixes at the new frequency calculated in block 1222. The processor may repeat the process of determining its velocity in block 1214.

If the processor executing the call extender daemon determines that the speed of the mobile communication device is not less than 3 km/hr (i.e., determination block 1220="No"), the processor may reset the frequency x may to one in block 1226. In determination block 1230, the processor executing the call extender daemon may determine whether the currently measured speed is in the range of 3-10 km/hr, and if so (i.e., determination block 1230="Yes"), the processor may apply a linear function suitable for such a moderate speed to change the location fix frequency in block 1232. In particular, the processor may change the frequency x by the function x=x+2. The processor may set an upper limit on the location fix frequency (i.e., Lim x=5) in block 1232 that may be lower to ensure location fixes are obtained at a moderate frequency because the mobile communication device is not stationary. In block 1234, the processor executing the call extender daemon or another resource may obtain the set number n of location fixes at the new frequency calculated in block 1232. In block 1236 the processor executing the call extender daemon may make another velocity determination and repeat the moderate speed determination in determination block 1230 to determine whether the speed remains within the range of 3-10 km/hr.

If the processor executing the call extender daemon determines that the speed of the mobile communication device is not between the range of 3-10 km/hr (i.e., determination block 1230="No"), the processor may reset the frequency x to one in block 1238. In determination block 1240, the processor executing the call extender daemon may determine whether the currently measured speed is greater than 10 km/hr, and if so (i.e., determination block 1240=Yes), the processor may change the frequency x to a fixed frequency x=x+2 consistent with the mobile communication device moving fast in block 1242. Such a fix frequency ensures a relatively high rate of location fixes may be obtained in block 1244. The processor executing the call extender daemon or another device resource may make another velocity determination in block 1246, and repeat the high speed determination in determination block 1240 to determine whether the speed remains greater than 10 km/hr. If the processor executing the call extender daemon determines that the speed of the mobile communication device is no longer greater than 10 km/hr (i.e., determination block 1240="No"), the processor may reset the fix taking frequency x to one in block 1212 and the operations described above.

Figure 13:
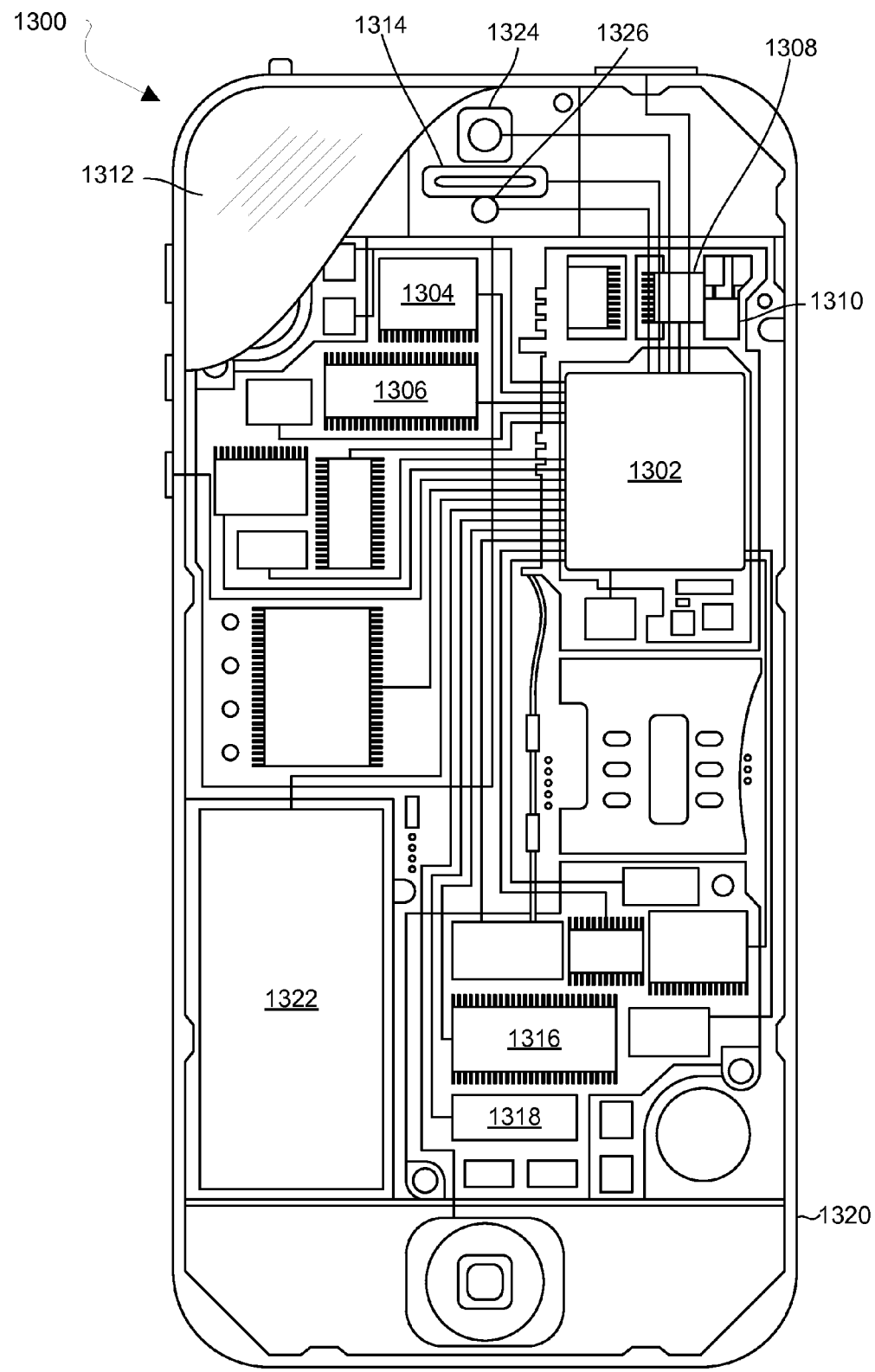
FIG. 13 is a component block diagram of a mobile device suitable for use in the various embodiments.

The embodiments may be implemented in a variety of mobile communication devices. An example of a mobile communication device that may implement the various embodiments is a Smartphone represented by mobile communication device 1300 illustrated in FIG. 13. The mobile communication device 1300 may include a processor 1302 coupled to a touchscreen controller 1304 and an internal memory 1306. The processor 1302 may be one or more multicore ICs designated for general or specific processing tasks. The internal memory 1306 may be volatile or non-volatile memory, and may also be secure and/or encrypted memory, or unsecure and/or unencrypted memory, or any combination thereof. The touchscreen controller 1304 and the processor 1302 may also be coupled to a touchscreen panel 1312, such as a resistive-sensing touchscreen, capacitive-sensing touchscreen, infrared sensing touchscreen, etc. The mobile communication device 1300 may have one or more radio transceivers, including a cellular network wireless transceiver 1308 as well as other types of transceivers (e.g., Peanut®, Bluetooth®, Zigbee®, Wi-Fi, RF radio, GPS) and antennae 1310, for sending and receiving, coupled to each other and/or to the processor 1302. The mobile communication device 1300 may include a cellular network wireless modem 1316 coupled to the cellular network wireless transceiver 1308 and to the processor that enables communications via a cellular telephone network. The transceivers 1308 and antennae 1310 may be used with the above-mentioned circuitry to implement the various wireless transmission protocol stacks and interfaces. The mobile communication device 1300 may include a peripheral device connection interface 1318 coupled to the processor 1302. The peripheral device connection interface 1318 may be singularly configured to accept one type of connection, or multiply configured to accept various types of physical and communication connections, common or proprietary, such as USB, FireWire, Thunderbolt, or PCIe. The peripheral device connection interface 1318 may also be coupled to a similarly configured peripheral device connection port (not shown). The mobile communication device 1300 may also include speakers 1314 for providing audio outputs, a camera 1324 for receiving video inputs and one or more other sensors 1326 for supplemental input, like a proximity sensor. The mobile communication device 1300 may also include a housing 1320, constructed of a plastic, metal, or a combination of materials, for containing all or some of the components discussed herein. The mobile communication device 1300 may include a power source 1322 coupled to the processor 1302, such as a disposable or rechargeable battery. The rechargeable battery may also be coupled to the peripheral device connection port to receive a charging current from a source external to the mobile communication device 1300.

Figure 14:
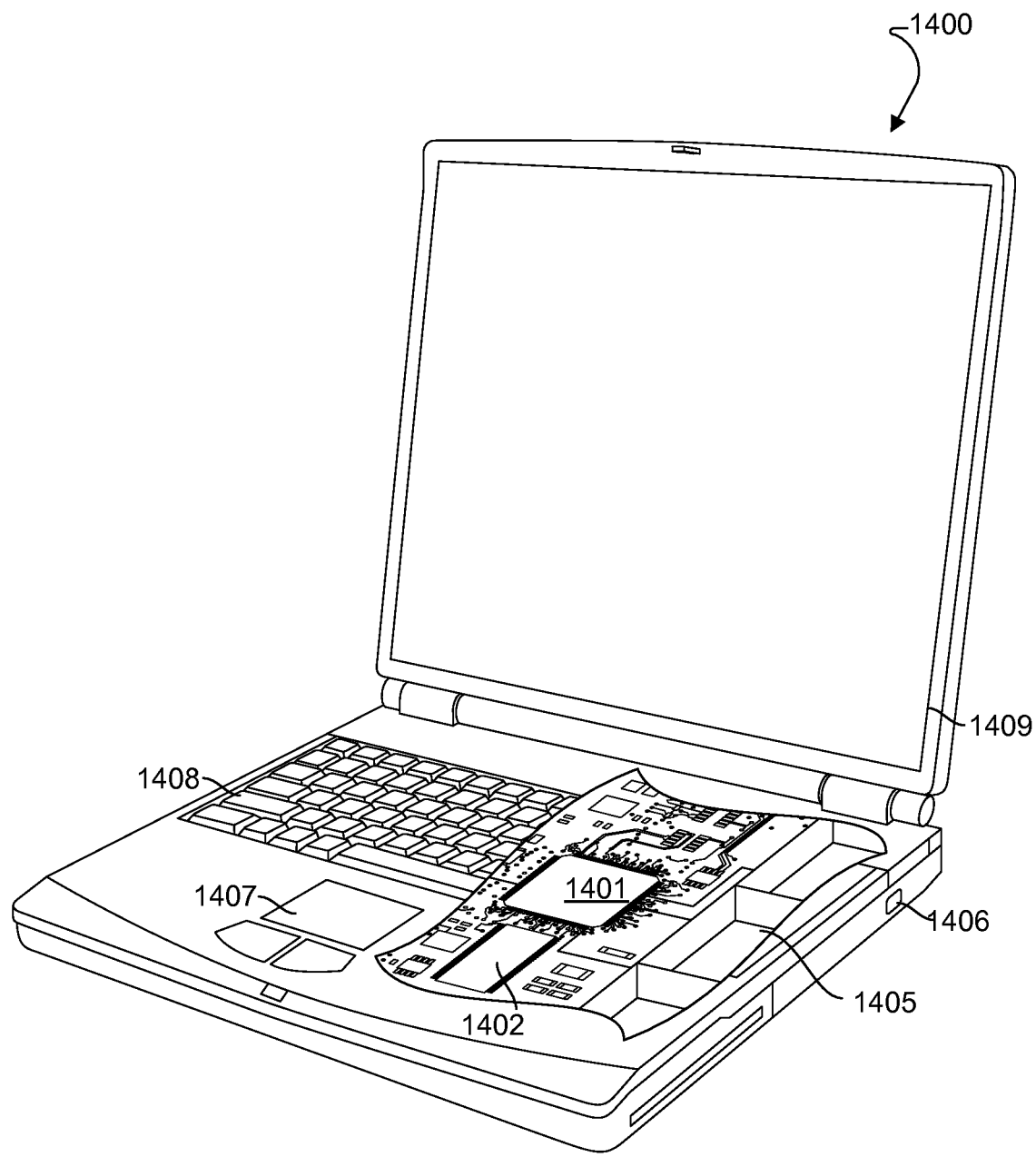
FIG. 14 is a component block diagram of a server device suitable for use in the various embodiments.

The various embodiments may be implemented on any of a variety of commercially available server devices, such as the server 1400 illustrated in FIG. 14. Such a server 1400 typically includes a processor 1401 coupled to volatile memory 1402 and a large capacity nonvolatile memory, such as a disk drive 1403. The server may be configured with server-executable instructions to perform operations of the embodiment methods described above, and such server-executable instructions may be stored on the disk drive 1403 and executed by the processor 1401. The server 1400 may also include a floppy disc drive, compact disc (CD) or DVD disc drive 1406 coupled to the processor 1401. The server 1400 may also include network access ports 1404 coupled to the processor 1401 for establishing data connections with a network 1405, such as a local area network coupled to other broadcast system computers and servers. The processors 1301, 1401 may be any programmable microprocessor, microcomputer or multiple processor chip or chips that can be configured by instructions (applications or software) to perform a variety of functions, including the functions of the various embodiments described above. In some devices, multiple processors 1301, 1401 may be provided, such as one processor dedicated to mobile communication functions and one processor dedicated to running other applications. Typically, software applications may be stored in the internal memory 1302, 1402, and 1403 before they are accessed and loaded into the processor 1301, 1401.

The processor 1301, 1401 may include internal memory sufficient to store the application instructions. In many devices the internal memory may be a volatile or nonvolatile memory, such as flash memory, or a mixture of both. For the purposes of this description, a general reference to memory refers to memory accessible by the processor 1301, 1401 including internal memory or removable memory plugged into the device and memory within the processor 1301, 1401 itself.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more embodiments, the functions described may be implemented in hardware, software, firmware, or any combination thereof. If implemented in software, the functions may be stored on as one or more instructions or code on a non-transitory computer-readable storage medium. The operations of a method or algorithm disclosed herein may be embodied in a processor-executable software module that may reside or be stored on a non-transitory computer readable storage medium or processor-readable medium. Non-transitory computer-readable and processor-readable storage media may be any available media that may be accessed by a computer or processor. By way of example, and not limitation, such non-transitory computer-readable and processor-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the principles and novel features disclosed herein.

What is claimed is:

1. A method of dynamically adjusting mobile communication device resources for maintaining an active call, comprising:
   receiving at a mobile communication device an activation input from a remote server;
   activating a call extender daemon on the mobile communication device in response to receiving the activation input, wherein the call extender daemon is not subject to being deactivated by a user of the mobile communication device;
   determining a state of onboard resources of the mobile communication device;
   determining a first resource adjustment based on the state of onboard resources; and
   adjusting an operating state of a first onboard resource of the mobile communication device by the call extender daemon based on the activation input to increase a likelihood of maintaining the active call on the mobile communication device and without alerting the user of the mobile communication device, wherein adjusting the operating state of the first onboard resource of the mobile communication device by the call extender daemon comprises implementing the determined first resource adjustment.

2. The method of claim 1, further comprising determining a historical usage pattern of the onboard resources of the mobile communication device, wherein determining the first resource adjustment is also based on the historical usage pattern.

3. The method of claim 1, wherein the activation input is received by way of at least one of an Internet protocol channel, a unicast message, and an overhead power control channel.

4. The method of claim 1, further comprising:
   receiving at the mobile communication device a registration initiator from the remote server; and
   transmitting a register request from the mobile communication device to the remote server in response to receiving the registration initiator, wherein the register request is adapted to provide the remote server with an end point address for delivery of commands to the call extender daemon on the mobile communication device.

5. The method of claim 1, further comprising:
   transmitting from the mobile communication device a resource status indication message indicating a state of the first onboard resource and the operating state of the mobile communication device.

6. The method of claim 5, further comprising:
   receiving the resource status indication message from the mobile communication device in the remote server;
   determining a first resource adjustment based on the state of the first onboard resource indicated in the resource status indication message; and transmitting the activation input including the determined first resource adjustment to the mobile communication device.

7. A mobile communication device, comprising:
a cellular network wireless transceiver; and
a processor coupled to the cellular network wireless transceiver and configured with processor-executable instructions to perform operations comprising:
receiving an activation input from a remote server;
activating an call extender daemon executing on the processor in response to receiving the activation input, wherein the call extender daemon is not subject to being deactivated by a user of the mobile communication device;
determining a state of onboard resources of the mobile communication device;
determining a first resource adjustment based on the state of onboard resources; and
adjusting an operating state of a first onboard resource of the mobile communication device by the call extender daemon based on the activation input to increase a likelihood of maintaining an active call on the mobile communication device and without alerting the user of the mobile communication device, wherein adjusting the operating state of the first onboard resource of the mobile communication device by the call extender daemon comprises implementing the determined first resource adjustment.

8. The mobile communication device of claim 7, wherein the processor is configured with processor-executable instructions to perform operations further comprising determining a historical usage pattern of the onboard resources of the mobile communication device, wherein determining the first resource adjustment is also based on the historical usage pattern.

9. The mobile communication device of claim 7, wherein the processor is configured with processor-executable instructions to perform operations such that the activation input is received from the remote server by way of at least one of an Internet protocol channel, a unicast message, and an overhead power control channel.

10. The mobile communication device of claim 7, wherein the processor is configured with processor-executable instructions to perform operations further comprising:
receiving a registration initiator from the remote server; and
transmitting a register request to the remote server in response to receiving the registration initiator, wherein the register request is adapted to provide the remote server with an end point address for delivery of commands to the call extender daemon on the mobile communication device.

11. The mobile communication device of claim 7, wherein the processor is configured with processor-executable instructions to perform operations further comprising:
transmitting to the remote server a resource status indication message indicating a state of the first onboard resource and the operating state of the mobile communication device.

12. A non-transitory processor-readable medium having stored thereon processor-executable instructions configured to cause a processor of a mobile communication device to perform operations comprising:
receiving an activation input from a remote server;
activating an call extender daemon executing on the processor in response to receiving the activation input, wherein the call extender daemon is not subject to being deactivated by a user of the mobile communication device;
determining a state of onboard resources of the mobile communication device;
determining a first resource adjustment based on the state of onboard resources; and
adjusting an operating state of a first onboard resource of the mobile communication device by the call extender daemon based on the activation input to increase a likelihood of maintaining an active call on the mobile communication device and without alerting the user of the mobile communication device, wherein adjusting the operating state of the first onboard resource of the mobile communication device by the call extender daemon comprises implementing the determined first resource adjustment.

13. The non-transitory processor-readable medium of claim 12, wherein the stored processor-executable instructions are configured to cause the processor of the mobile communication device to perform operations further comprising determining a historical usage pattern of the onboard resources of the mobile communication device, wherein determining the first resource adjustment is also based on the historical usage pattern.

14. The non-transitory processor-readable medium of claim 12, wherein the stored processor-executable instructions are configured to cause the processor of the mobile communication device to perform operations such that the activation input is received by way of at least one of an Internet protocol channel, a unicast message, and an overhead power control channel.

15. The non-transitory processor-readable medium of claim 12, wherein the stored processor-executable instructions are configured to cause the processor of the mobile communication device to perform operations further comprising:
receiving a registration initiator from the remote server; and
transmitting a register request from the mobile communication device in response to receiving the registration initiator, wherein the register request is adapted to provide the remote server with an end point address for delivery of commands to the call extender daemon on the mobile communication device.

16. The non-transitory processor-readable medium of claim 12, wherein the stored processor-executable instructions are configured to cause the processor of the mobile communication device to perform operations further comprising:
transmitting from the mobile communication device a resource status indication message indicating a state of the first onboard resource and the operating state of the mobile communication device.

17. A cellular telephone system, comprising:
a cellular telephone network;
a server coupled to the cellular telephone network; and
a mobile communication device comprising:
a cellular network wireless transceiver; and
a processor coupled to the cellular network wireless transceiver and configured with processor-executable instructions to perform operations comprising transmitting to the server a resource status indication message indicating a state of a first onboard resource and an operating state of the mobile communication device, wherein the server is configured with server-executable instructions to perform operations comprising:
receiving the resource status indication message from the mobile communication device;
determining a first resource adjustment based on the state of the first onboard resource indicated in the resource status indication message to increase a likelihood of maintaining an active call on the mobile communication device; and
transmitting an activation input including the determined first resource adjustment to the mobile communication device, and
wherein the processor of the mobile communication device is configured with processor-executable instructions to perform operations further comprising:
receiving the activation input from the server;
activating a call extender daemon executing on the processor in response to receiving the activation input, wherein the call extender daemon is not subject to being deactivated by a user of the mobile communication device; and
adjusting the operating state of the first onboard resource of the mobile communication device by the call extender daemon based on the activation input.

18. The cellular telephone system of claim 17, wherein the server is configured with server-executable instructions to perform operations such that transmitting the activation input including the determined first resource adjustment to the mobile communication device comprises transmitting the activation input by way of at least one of an Internet protocol channel, a unicast message, and an overhead power control channel.

* * * * *